US008408420B2

(12) United States Patent
Almada et al.

(10) Patent No.: US 8,408,420 B2
(45) Date of Patent: Apr. 2, 2013

(54) LIFTING AND ROTATING WATER RESERVOIR WITH ATTACHED WATER BOTTLE FOR DISPENSING OF WATER FROM WATER COOLER

(75) Inventors: Gonzalo Almada, Palmetto Bay, FL (US); Ian Kovacevich, Charlotte, NC (US); Kevin Dahlquist, Charlotte, NC (US); Thomas Philpott, Charlotte, NC (US)

(73) Assignee: Inspiration Trend, LLC, Miami, FL (US)

( * ) Notice: Subject to any disclaimer, the term of this patent is extended or adjusted under 35 U.S.C. 154(b) by 71 days.

(21) Appl. No.: 13/190,268

(22) Filed: Jul. 25, 2011

(65) Prior Publication Data

US 2012/0097291 A1 Apr. 26, 2012

Related U.S. Application Data

(63) Continuation-in-part of application No. PCT/US2011/001304, filed on Jul. 23, 2011.

(60) Provisional application No. 61/367,368, filed on Jul. 23, 2010, provisional application No. 61/427,472, filed on Dec. 27, 2010.

(51) Int. Cl.

| | |
|---|---|
| ***B67B 7/00*** | (2006.01) |
| ***G01F 11/00*** | (2006.01) |
| ***B67D 7/80*** | (2010.01) |
| ***B67D 7/84*** | (2010.01) |

(52) U.S. Cl. .......... 222/1; 222/146.1; 222/160; 222/166

(58) Field of Classification Search ........... 222/1, 146.1, 222/146.6, 160, 166, 167, 168, 183, 185.1; 141/284, 319, 366, 375, 376; 414/422, 758; 248/122.1, 309.1, 310, 288.11, 291.1, 296.1

See application file for complete search history.

(56) References Cited

U.S. PATENT DOCUMENTS 2,414,774 A 1/1947 Spinks
4,036,382 A 7/1977 Perry et al.

(Continued)

FOREIGN PATENT DOCUMENTS

WO 2012011964 A2 1/2012
WO 2012011964 A3 7/2012

OTHER PUBLICATIONS

Information Disclosure Statement (IDS) Letter Regarding Common Patent Application(s), dated Jan. 23, 2013.

(Continued)

*Primary Examiner* — Kevin P Shaver
*Assistant Examiner* — Vishal Pancholi
(74) *Attorney, Agent, or Firm* — Tillman Wright, PLLC; Chad D. Tillman; Jeremy C. Doerre

(57) ABSTRACT

A water dispensing apparatus includes a lifting system and a water reservoir. The apparatus automatically installs a water bottle by lowering and inverting the water reservoir atop a water bottle, coupling the water reservoir to the water bottle, and raising and inverting the water reservoir with the water bottle coupled therewith. One or more compartments are filled with water from the inverted water bottle, and water is dispensed from each compartment through a dispenser. Multiple compartments may be included in the water reservoir, with the water in one compartment being electrically cooled and water in another compartment being electrically heated.

11 Claims, 56 Drawing Sheets

U.S. PATENT DOCUMENTS 4,213,727 A 7/1980 Lighthipe
4,629,096 A * 12/1986 Schroer et al. ............. 222/146.6
4,646,944 A * 3/1987 Sanderson .................... 222/108
4,797,050 A * 1/1989 Habicht ........................ 414/420
4,846,236 A 7/1989 Deruntz
4,993,229 A * 2/1991 Baus et al. ..................... 62/3.64
5,127,618 A 7/1992 Page et al.
5,280,764 A 1/1994 Levinrad
5,288,200 A 2/1994 Burgers et al.
5,372,470 A * 12/1994 Wilke et al. ................... 414/641
5,379,814 A 1/1995 Posly
5,388,953 A * 2/1995 Habicht ........................ 414/810
5,406,996 A 4/1995 Wagner et al.
5,425,614 A 6/1995 Perussi et al.
5,582,503 A 12/1996 Sandoval
5,592,724 A * 1/1997 Linville et al. .................... 27/12
5,732,857 A * 3/1998 Yared ......................... 222/185.1
5,784,740 A 7/1998 DiSieno et al.
5,846,043 A 12/1998 Spath
5,944,470 A 8/1999 Bonerb
6,349,906 B1 * 2/2002 Anderson ..................... 248/146
6,561,753 B2 5/2003 Frias et al.
6,830,421 B1 * 12/2004 Broderick ..................... 414/422
6,834,691 B2 12/2004 Goldin
6,843,634 B2 1/2005 Goldin
7,168,599 B1 * 1/2007 Criswell et al. ............... 222/608
2005/0045426 A1 3/2005 Rennetaud et al.
2008/0053564 A1 3/2008 Spear et al.
2008/0142549 A1 * 6/2008 Kosich .......................... 222/160
2009/0304487 A1 * 12/2009 Gonzalo ....................... 414/738

OTHER PUBLICATIONS

"International Search Report" and "Written Opinion of the International Searching Authority" (ISA/KR Korean Intellectual Property Office ) in Inspiration Trend LLC et al., International Patent Application Serial No. PCT/US2011/001304, Mar. 19, 2012, 8 pages.

* cited by examiner

10

22

22

14

410

414

LIFTING AND ROTATING WATER RESERVOIR WITH ATTACHED WATER BOTTLE FOR DISPENSING OF WATER FROM WATER COOLER

CROSS-REFERENCE TO RELATED APPLICATIONS

The present application is a U.S. continuation-in-part patent application of, and claims priority under 35 U.S.C. §120 to, international patent application no. PCT/US2011/01304, filed Jul. 23, 2011 and titled "LIFTING AND ROTATING WATER RESERVOIR WITH ATTACHED WATER BOTTLE FOR DISPENSING OF WATER FROM WATER COOLER", which international patent application is, for purposes of the United States of America, a U.S. nonprovisional patent application of, and claims priority under 35 U.S.C. §119(e) to, each of U.S. provisional patent application Ser. No. 61/367,368, filed Jul. 23, 2010, and U.S. provisional patent application Ser. No. 61/427,472, filed Dec. 27, 2010; the present application further is a U.S. nonprovisional patent application of, and claims priority under 35 U.S.C. §119(e) to, each of U.S. provisional patent application Ser. No. 61/367,368, filed Jul. 23, 2010, and U.S. provisional patent application Ser. No. 61/427,472, filed Dec. 27, 2010. Each of the above noted U.S. provisional patent applications is hereby incorporated herein by reference. A copy of each of these provisional patent applications is attached hereto as an appendix. Each of these appendices is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

Computer Program Listing

Submitted concurrently herewith via the USPTO's electronic filing system, and incorporated herein by reference, are computer program files including instructions, routines, and/or other contents of several computer program. A table setting forth the name and size of each file included in the computer program listing is included below.

| File Name | Creation Date | Size in Bytes | Description |
|---|---|---|---|
| readme.txt | 12/27/2010 - 5:28 PM | 2,616 | Instructions |
| ascify.txt | 12/27/2010 - 5:28 PM | 37,473 | assembly source code |
| edrawing.txt | 12/27/2010 - 5:28 PM | 2,744,225 | edrawing file |
| e2.txt | 7/23/2011 - 4:35 PM | 2,761,193 | edrawing file |

A first of these files, "readme.txt", contains instructions for utilizing a second of the files "ascify.txt" to extract information from "edrawing.txt" and "e2.txt". "edrawing.txt" and "e2.txt" are .easm eDrawing files that have been converted to ascii format. These files can be converted back to binary format utilizing a assembly conversion program source code for which is contained in "ascify.txt". The readme file includes instructions for compiling and running this conversion program, as well as instructions for converting "edrawing.txt" and "e2.txt" into .easm eDrawing files. These .easm eDrawing files can be viewed using SolidWorks' eDrawings program, currently available for free download at http://www.solidworks.com.

BACKGROUND OF THE INVENTION

The present invention generally relates to water coolers and methods of installing water cooler bottles therein.

Water coolers are designed to dispense water contained within commercial available water cooler bottles of varying sizes. Most water coolers, when in use, require a water bottle to be located above a dispensing opening. This requires a user to lift and invert the water bottle. This can be problematic, as water cooler bottles can be heavy. Water can easily be spilled during the installation process, too.

Several solutions have been offered to these problems. For instance, U.S. Pat. No. 4,036,382 to Perry provides a bottle handling apparatus for installing a water cooler bottle in a water cooler. The water bottle is placed at the base of the apparatus, which is adjacent to a water cooler. The apparatus then lifts the bottle from floor level in an upright position, rotates the water bottle, and then lowers the inverted water bottle into a bottle receiving inlet of the water cooler.

Another solution is offered by U.S. Pat. No. 3,934,772 to Brannon, in which a pair of U-shaped rods is used to more easily secure, lift and rotate the water bottle in order to install the water bottle into a water cooler.

While conventional solutions exist, it is believed that a need remains for improvement in water coolers and methods of installing water cooler bottles. One or more aspects and features of the present invention is believed to address such continuing need.

SUMMARY OF THE INVENTION

The present invention includes many aspects and features. Moreover, while many aspects and features relate to, and are described in, the context of water coolers, the present invention is not limited to use only in water coolers, as will become apparent from the following summaries and detailed descriptions of aspects, features, and one or more embodiments of the present invention. Thus, the present invention may be used, for example, in a generic water dispensing context regardless of whether water is "cooled" relative to ambient environmental temperature.

Accordingly, one aspect of the present invention relates to a water dispensing apparatus as substantially shown and described herein.

Another aspect of the present invention relates to a method of installing a water bottle in a water dispensing apparatus as substantially shown and described herein.

In another aspect, a water dispensing apparatus comprises a water reservoir and a lifting system. The water reservoir comprises a compartment for receiving and storing water from a water bottle; a water bottle receiving area by which a mouth of a water bottle is received for the flow of water from the water bottle into the compartment of the water reservoir; a mechanism by which a water bottle is securely coupled to the water reservoir; and a dispenser by which a user selectively dispenses water from the compartment of the water reservoir. The lifting system comprises a carriage; a track along which the carriage traverses; a motor assembly by which traversal of the carriage along the track is driven; and a coupling mechanism connecting the water reservoir to the carriage and enabling rotation of the water reservoir relative to the carriage. The water reservoir is transitionable between a lower position of the water reservoir and an upper position of the water reservoir. In the lower position, a water bottle in an upright orientation is coupled to the water reservoir, with a mouth of the water bottle being received in the water bottle receiving area of the water reservoir. In the upper position of the water reservoir, the water reservoir is rotated and a water bottle coupled thereto is transitioned into an inverted orientation, with the mouth of the water bottle facing downwardly for gravitationally induced flow of water from the water bottle into the water reservoir.

In a feature of this aspect, the water dispensing apparatus further includes a water bottle coupled with the water reservoir.

In a feature of this aspect, the water reservoir is configured to engage the water cooler bottle such that a watertight seal is formed between the water reservoir and the water cooler bottle, whereby water received within the water reservoir from the water cooler bottle does not leak during rotation of the water reservoir and inversion of the water bottle.

In a feature of this aspect, the lifting system comprises a single vertical support.

In a feature of this aspect, the lifting system comprises two vertical supports, each vertical support extending on an opposite side of the water reservoir.

In a feature of this aspect, rotation of the water reservoir is simultaneous with, and dependent upon, movement of the carriage along at least a portion of the track.

In a feature of this aspect, the water reservoir comprises a first compartment in which water is stored and cooled, and a second compartment in which water is stored and heated.

In another aspect of the invention, a method for installing a water bottle in a water dispensing apparatus includes the steps of: coupling a water reservoir to a water bottle oriented in an upright position; raising and rotating the water reservoir with the water bottle coupled therewith such that the water bottle is inverted; and filling a compartment of the water reservoir with water from the inverted water bottle as a result of the inversion of the water bottle for dispensing of water from the compartment through a dispenser of the water reservoir.

In a feature, the method further includes the step of dispensing water from the compartment of the water reservoir through a dispenser of the water reservoir.

In a feature, the method further includes the steps of: lowering and rotating the water reservoir with the water bottle coupled therewith such that the water bottle is returned to the upright position, wherein the water bottle is generally emptied of water; decoupling the water reservoir from the water bottle oriented in the upright position; replacing the water bottle with a generally full water bottle; raising and rotating the water reservoir with the water bottle coupled therewith such that the water bottle is inverted; and filling the compartment of the water reservoir with water from the inverted water bottle as a result of the inversion of the water bottle for further dispensing of water from the compartment through the dispenser of the water reservoir.

Another aspect of the present invention relates to a water dispensing apparatus that comprise a lifting system and a water reservoir. The lifting system is adapted to raise and lower the water reservoir, and is adapted to rotate the water reservoir.

In a feature of this aspect of the invention, the lifting system further comprises a track.

In another feature, the lifting system further comprises a track and the water reservoir is raised and lowered along the track.

In yet another feature, the lifting system further comprises a track, the water reservoir is raised and lowered along the track, and the water reservoir is simultaneously rotated as it is raised and lowered along the track.

In still another feature, the lifting system further comprises a track, the water reservoir is raised and lowered along the track, and a button initiates the raising and lowering and rotation of the water reservoir.

In another feature of this aspect of the invention, the lifting system further comprises a pair of coupling mechanisms by which the water reservoir is joined to the lifting system.

In yet another feature, the lifting system further comprises a base and the lifting system is adapted to rotate and lower the water reservoir onto a water cooler bottle located at the base.

Another aspect of the present invention relates to a water cooler comprising a lifting system, a water reservoir, and a water cooler bottle. The water cooler bottle is secured to the water reservoir to form a water tight seal by which the water in the water cooler bottle fills the water reservoir. Additionally, the lifting system raises and lowers the water reservoir with the water cooler bottle secured thereto, with the water reservoir and water cooler bottle being rotated during lifting from a first position to an inverted position for dispensing of the water.

In a feature of this aspect, the water reservoir comprises a cooling compartment (sometimes referred to also as a cooling reservoir) for storing water and cooling water stored therein. The water preferably is cooled using one or more Peltier elements in contact with the cooling reservoir. A Peltier element is also sometimes referred to as a Peltier cooler or thermoelectric (TE) module. Each Peltier element preferably includes a fan for cooling of the hot side of the Peltier element.

In another feature, the water reservoir includes a heating compartment (sometimes referred to also as a heating reservoir) for storing water and heating water stored therein. The water preferably is heated using one or more electrical heating elements.

In another feature, the water reservoir comprises a bottle receiving area configured to receive a water cooler bottle therein.

In still a further feature, the lifting system is adapted invert the water reservoir and lower the water reservoir onto a water cooler bottle, such that a neck of the water cooler bottle protrudes through the aperture in the bottle receiving area.

In another feature, a clamping mechanism secures the water cooler bottle to the water reservoir.

In still another feature, the clamping mechanism a clamping mechanism secures the water cooler bottle to the water reservoir and forms a watertight seal with the water cooler bottle.

In another feature, the apparatus is further adapted to lift and rotate the water cooler bottle to an inverted position for dispensing of water.

Another aspect of the present invention relates to a fluid cooling apparatus. An exemplary such apparatus includes a cooling reservoir and one or more Peltier elements. Furthermore, in this aspect of the invention, the one or more Peltier elements are adapted to remove heat from a fluid contained within the cooling reservoir as an electrical current passes through the one or more Peltier elements.

A feature of this aspect of the invention includes a controller that regulates the amount of electrical current supplied to the one or more Peltier elements. The controller may be a thermostat.

In another feature still, the apparatus further includes a heating reservoir and one or more heating elements, wherein the one or more heating elements are adapted to heat a fluid contained within the heating reservoir as an electrical current passes through the one or more heating elements.

In yet another feature, the apparatus includes an insulation system.

In another aspect of the invention, a method for installing a water cooler bottle in a water dispensing apparatus for dispensing water includes the steps of: positioning a water cooler bottle in an upright orientation underneath a water reservoir, the water reservoir including a dispenser through which water is dispensed to a user; lowering the water reservoir on top of the water cooler bottle; coupling together the water reservoir and water cooler bottle; lifting the water reservoir and water cooler bottle coupled thereto; rotating the water reservoir and water cooler bottle coupled thereto such that the water cooler bottle transitions to an inverted position; and filling the water reservoir with water from the water cooler bottle for dispensing to a user.

In a feature of this aspect, the method further includes the step of heating water within the water reservoir.

In a feature of this aspect, the method further includes the step of cooling water within the water reservoir.

In a feature of this aspect, the method further includes the step of cooling water within a cooling compartment and the step of heating water within the water reservoir within a heating compartment that is a separate compartment from the cooling compartment.

The method further may include selectively dispensing water from the first and second compartments. In this respect, heated water may be dispensed through a first dispenser or tap, and cooled water may be dispensed through a second dispenser or tap.

Another aspect of the present invention relates to a water cooler. The water cooler includes a lifting system; a water reservoir; and a water cooler bottle. The water reservoir is coupled to the water cooler bottle such that water may fill the water reservoir from the water cooler bottle without leaking, and the lifting system is configured to raise and lower the water reservoir, with the water cooler bottle coupled thereto, between: a lower position, wherein the water cooler bottle is in an upright position and is supported at a bottom portion thereof, and a raised position, wherein the water cooler bottle is inverted relative to the first position and is supported at an upper portion thereof in its coupling with the water reservoir.

In a feature of this aspect, the bottle is supported at a bottom portion thereof by a base of the water cooler.

In a feature of this aspect, the bottle is supported at a bottom portion thereof by a floor on which the water cooler is supported.

In a feature of this aspect, the lifting system is configured to rotate the water reservoir and water cooler bottle coupled thereto between the lower position and the raised position.

In a feature of this aspect, the lifting system is configured to rotate the water cooler bottle between the upright position and the inverted position.

Another aspect of the present invention relates to a water dispensing apparatus as disclosed by the figures.

Another aspect of the present invention relates to a method of installing a water cooler bottle in a water cooler apparatus as disclosed by the figures.

Another aspect of the present invention relates to a water dispensing apparatus. The water dispensing apparatus includes a lifting system; and a water reservoir. The lifting system is adapted to raise and lower the water reservoir. The lifting system is further adapted to rotate the water reservoir during lifting. The lifting system comprises a mechanism for elevating the water reservoir including an inclined surface extending along a vertical extent of the lifting system from the bottom toward the top of the lifting system, the water reservoir riding along the inclined surface via a carriage; and a gear arrangement attached to the carriage by which the water reservoir rotates as the water reservoir is lifted along a particular vertical section of the lifting system between the top and bottom of the lifting system.

In a feature of this aspect, the lifting system further comprises a track. In some implementations, the water reservoir is raised and lowered along the track. In some implementations, the water reservoir is simultaneous rotated as it is raised and lowered along the track. Additionally, a rack is provided along a portion of the track that includes toothed members that engage the gear arrangement. In some implementations, the apparatus further comprises a button that, when pushed, initiates the raising, lowering and rotation of the water reservoir.

In a feature of this aspect, the lifting system further comprises a vertical support. In some implementations, the water reservoir is supported by a single vertical support and not multiple vertical supports.

In a feature of this aspect, the lifting system further comprises a base and wherein the lifting system is adapted to rotate and lower the water reservoir onto a water cooler bottle located at the base. In some implementations, the water reservoir is configured to securely couple to the water cooler bottle sufficient to retain the water cooler bottle during lifting and rotation of the water cooler bottle. In some implementations, the apparatus further comprises a clamp mechanism that couples the water reservoir to the water cooler bottle.

In a feature of this aspect, the water reservoir comprises a compartment in which water is stored and cooled. In some implementations, the water is cooled using one or more Peltier elements.

In a feature of this aspect, the water reservoir comprises a compartment in which water is stored and heated. In some implementations, the water is heated using one or more electrical heating elements.

In a feature of this aspect, the water reservoir comprises a bottle receiving area adapted to receive at least a top portion of a water cooler bottle therein.

In a feature of this aspect, the lifting system is adapted to invert the water reservoir and lower the water reservoir onto a water cooler bottle such that the upper portion of the water cooler bottle is received therein and a neck of the water cooler bottle protrudes through an aperture in the water reservoir. In some implementations, the water reservoir further comprises a clamping mechanism that secures the water cooler bottle to the water reservoir. In some implementations, the water reservoir is configured to engage the water cooler bottle such that a watertight seal is formed between the water reservoir and the water cooler bottle whereby water is received within the water reservoir from the water cooler bottle without leaking when the water cooler bottle is rotated. In some implementations, the apparatus is further adapted to lifting system and rotate the water cooler bottle to an inverted position.

Another aspect relates to a water dispensing apparatus that includes a lifting system comprising a base and a single vertical support extending upwardly from the base; and a water reservoir. The lifting system is adapted to raise and lower the water reservoir along the vertical support, and is adapted to rotate the water reservoir during lifting along the vertical support. The water reservoir is supported during lifting and rotation only by the single vertical support as opposed to multiple vertical supports.

Another aspect of the present invention relates to

In addition to the aforementioned aspects and features of the present invention, it should be noted that the present invention further encompasses the various possible combinations and subcombinations of such aspects and features.

Still further aspects and features of the present invention are represented by the claims and drawings.

BRIEF DESCRIPTION OF THE DRAWINGS

One or more preferred embodiments of the present invention now will be described in detail with reference to the accompanying drawings.

DETAILED DESCRIPTION

Figure 1:
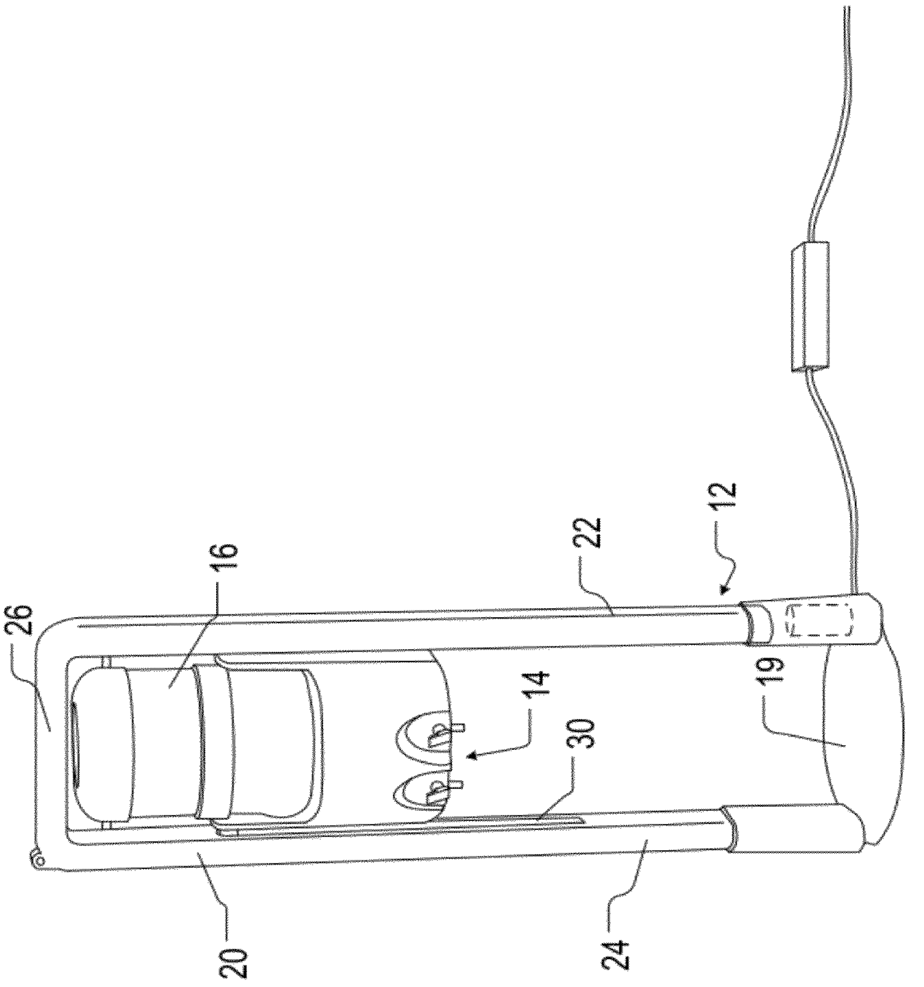
FIG. 1 illustrates a preferred embodiment of a water dispensing apparatus in accordance with one or more aspects of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6 in the United States, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIGS. 1-8 illustrate a water dispensing apparatus 10 with installed water bottle 16 in accordance with a preferred embodiment of one or more aspects of the present invention. The water dispensing apparatus 10 features an automated system for installing the water bottle 16. Furthermore, the water dispensing apparatus 10 uses electricity to separately heat and cool water for selected dispensing by a user of hot or cold water. The water dispensing apparatus 10 comprises a lifting system 12 and a water reservoir 14.

As illustrated, the lifting system 12 includes a base 19 and a U-shaped member 20 affixed to the base 19. The U-shaped member 16 has first and second vertical supports 22,24 joined by an integral horizontal support 26. The base 19 and the U-shaped member 20 enclose electronic components, including a motor (schematically shown in phantom in a foot of the vertical support 22), as well as mechanical components, such as gears enabling linear and rotational movement of the water reservoir 14. As shown, the motor may be powered by an electrical cord—including power converter—that plugs into a conventional wall outlet. Alternatively, or in addition thereto, the motor may be battery driven.

Figure 2:
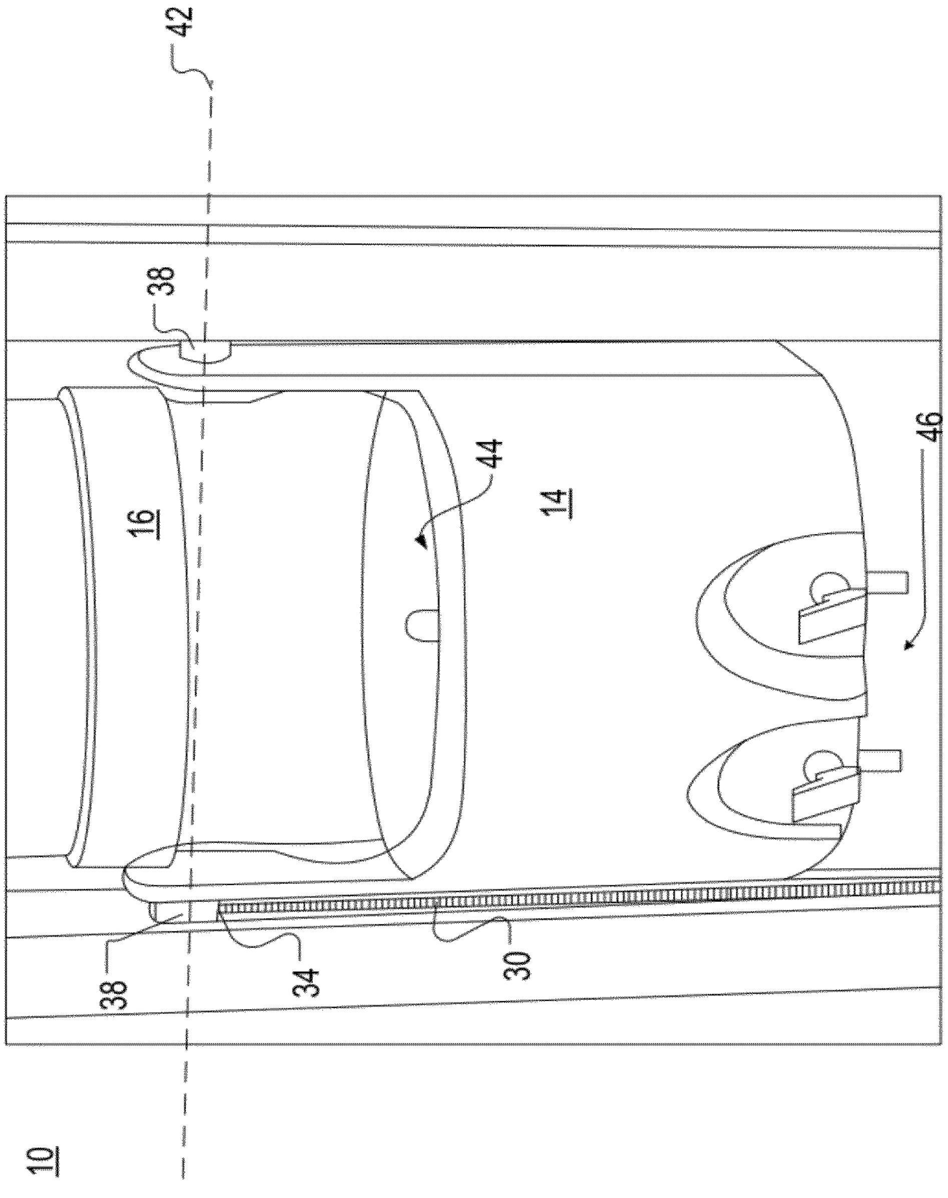
FIG. 2 is a close-up view of a portion of the water dispensing apparatus of FIG. 1.
Figure 3:
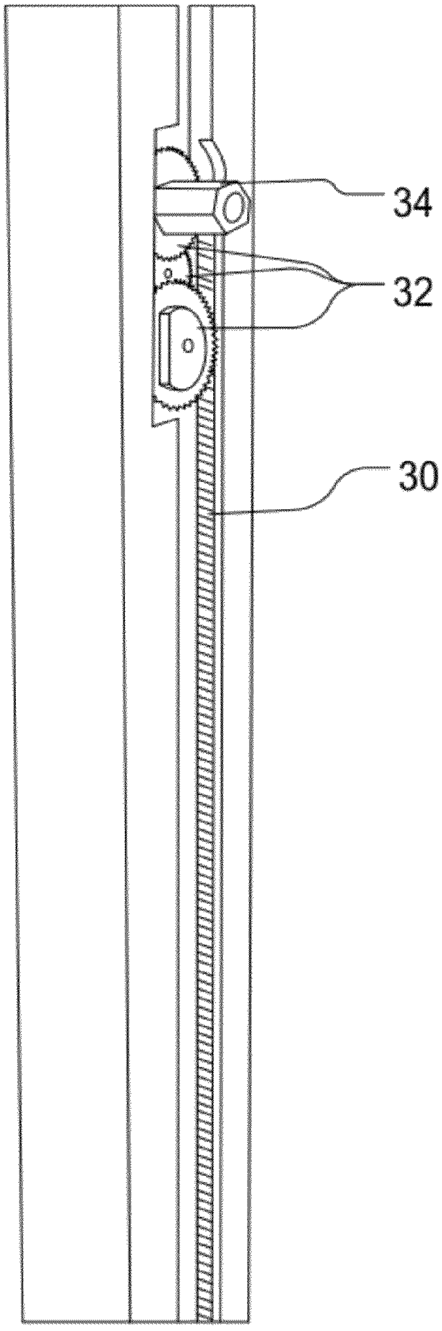
FIGS. 3-5 each illustrate portions of a vertical support member and various mechanical components housed therein, including a track and various gears, of the water dispensing apparatus of FIG. 1.
Figure 4:
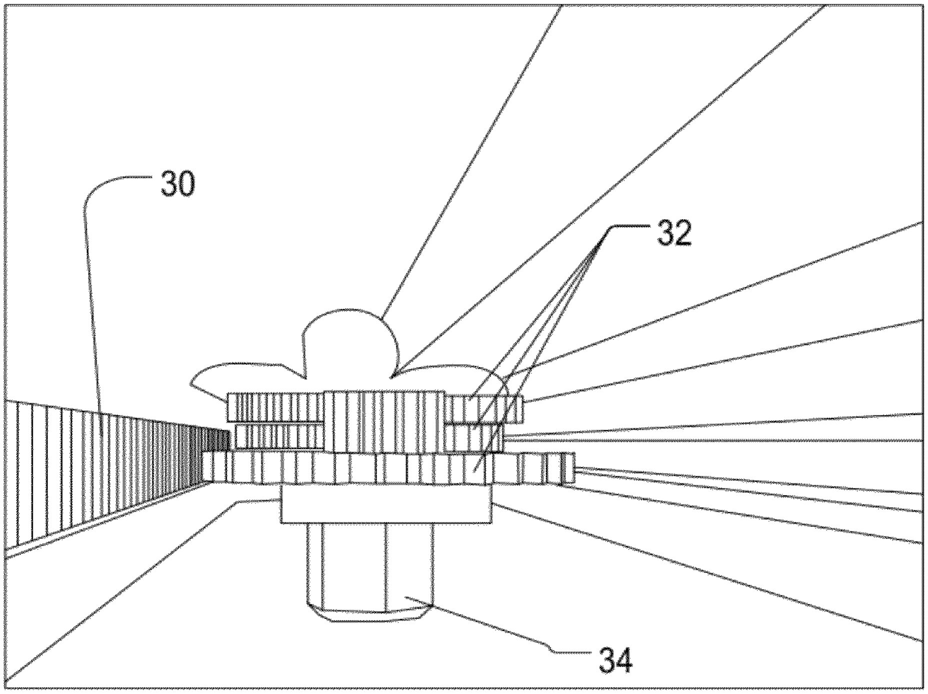
Figure 5:
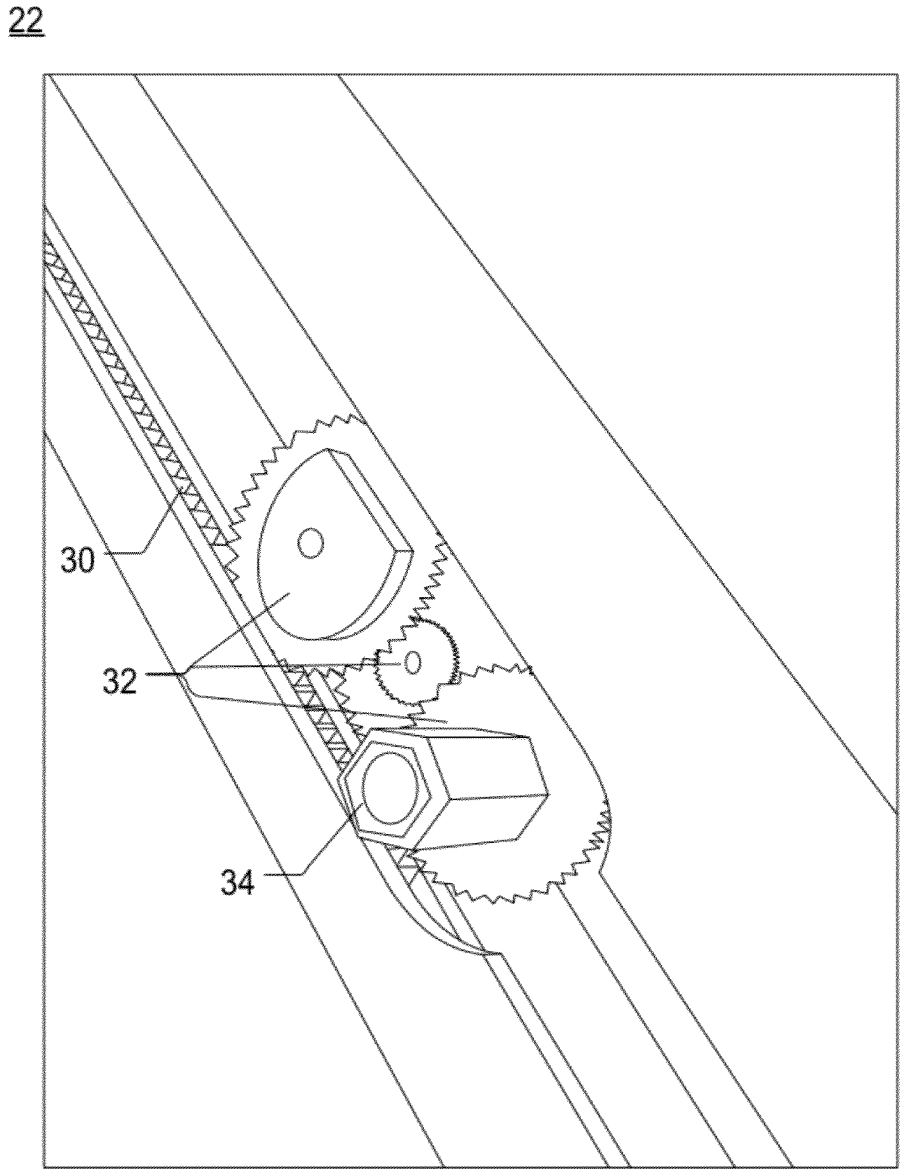

As shown generally in FIG. 2, and in greater detail in FIG. 3-5, each vertical support 22,24 defines a track and includes a rack 30 and an assembly of gears 32, including a gear with a hexagonal pin 34 extending therefrom and adapted to move up and down along said track. The hexagonal pins 34 are sized to be received by a pair of sockets 38 extending radially outward from the water reservoir 14, and thus securely couple the water reservoir 14 to the lifting system 12. The hexagonal pins 34 are disposed opposite one another and define a rotational axis 42. The hexagonal pins 34 are further configured to rotate the sockets 38, and thus the entire water reservoir 14, one hundred and eighty degrees around said rotational axis 42, thereby enabling rotation of the water reservoir relative to the track along the rack. It will be appreciated that other embodiments may not include hexagonal pins and sockets for effecting this coupling and, instead, may accomplish such coupling through other suitable mechanisms, which other mechanisms are included within the scope of the present invention.

Further shown in FIG. 2, the water reservoir 14 comprises a water bottle receiving area 44 and a dispensing area 46 with two dispensers (one for hot water and one for cold water). The bottle receiving area 44 includes an aperture adapted to receive the neck of the water bottle 16, and a wall of the aperture includes a clamping mechanism that provides a watertight seal around the neck of the water bottle 16. The water reservoir 14 is capable of both vertical motion up and down along the rack 30 and rotational motion about the rotational axis 42 defined by the hexagonal pins 34 and the sockets 38.

The bottle receiving area 44 is adapted to receive commercially available water cooler bottles 16. An exemplary such water bottle 16 is made of lightweight, transparent plastic, and has a generally cylindrical body with a top portion and a bottom portion, the top portion including a neck extending outwardly therefrom. The neck has an opening at the end thereof by which water enters and exits the bottle. The clamping mechanism of the water reservoir 14 secures the water bottle 16 to the bottle receiving area 44 by clamping tightly about the neck of the bottle 16 and creates a watertight seal that prevents water from escaping the water reservoir 14, even when the water bottle 16 is inverted.

The water dispensing apparatus 10 transitions between a raised configuration and a lowered configuration in which the water reservoir 14 is located in an upper position and lower position, respectively. In at least one preferred embodiment, this transition is accomplished by the user pressing a single button.

FIGS. 1 and 2 show the water dispensing apparatus 10 in the raised configuration, including a water bottle 16 installed therein. In the raised configuration, the water reservoir 14 is oriented such that the bottle receiving area 44 is at the top of the water reservoir 14 and the dispensing area 46 is toward the lower portion of the water reservoir 14. Furthermore, in the raised configuration, the hexagonal pins 34 are situated near the top of the racks 30. If a water bottle 16 is installed, the water bottle 16 will be oriented upside-down such that the force of gravity will urge the water to flow from the water bottle 16 into the water reservoir 14.

In the lowered configuration, the water reservoir 14 is oriented such that the bottle receiving area 44 is below the dispensing area 46. Furthermore, in the lowered configuration the hexagonal pins 34 are located nearer the bottom of the racks 30, thus lowering the water reservoir 14 from its raised configuration height. If a water bottle 16 is installed, the water bottle 16 will be in an upright orientation. Preferably, one or more pressure regulators housed within the water reservoir 14 prevent gravity from forcing any water out of the water reservoir 14 and into the water bottle 16, whereby water is retained in the compartments of the water reservoir 14.

Figure 6:
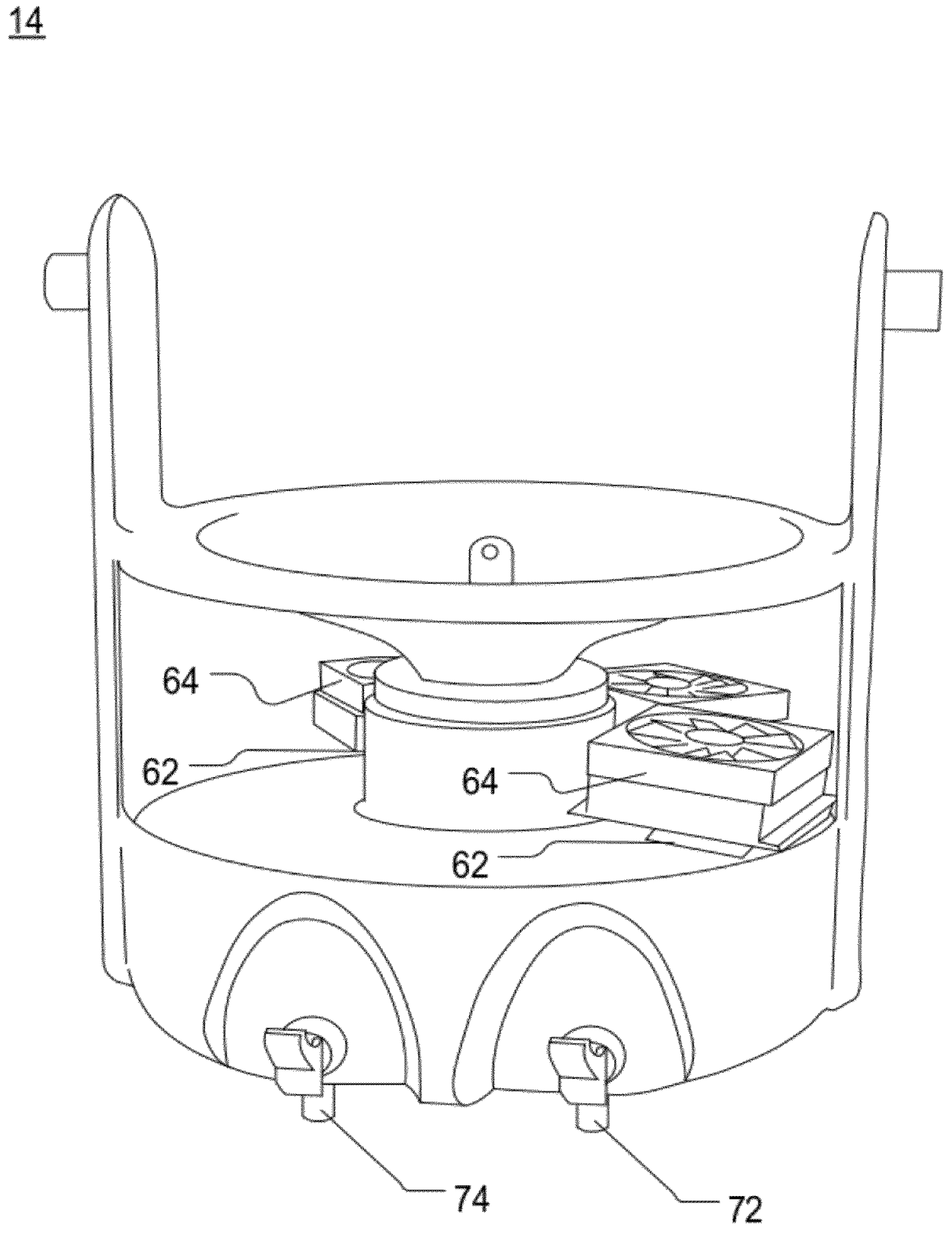
FIG. 6 is a partial cutaway front perspective view of a water reservoir of the water dispensing apparatus of FIG. 1 showing components housed therein.
Figure 7:
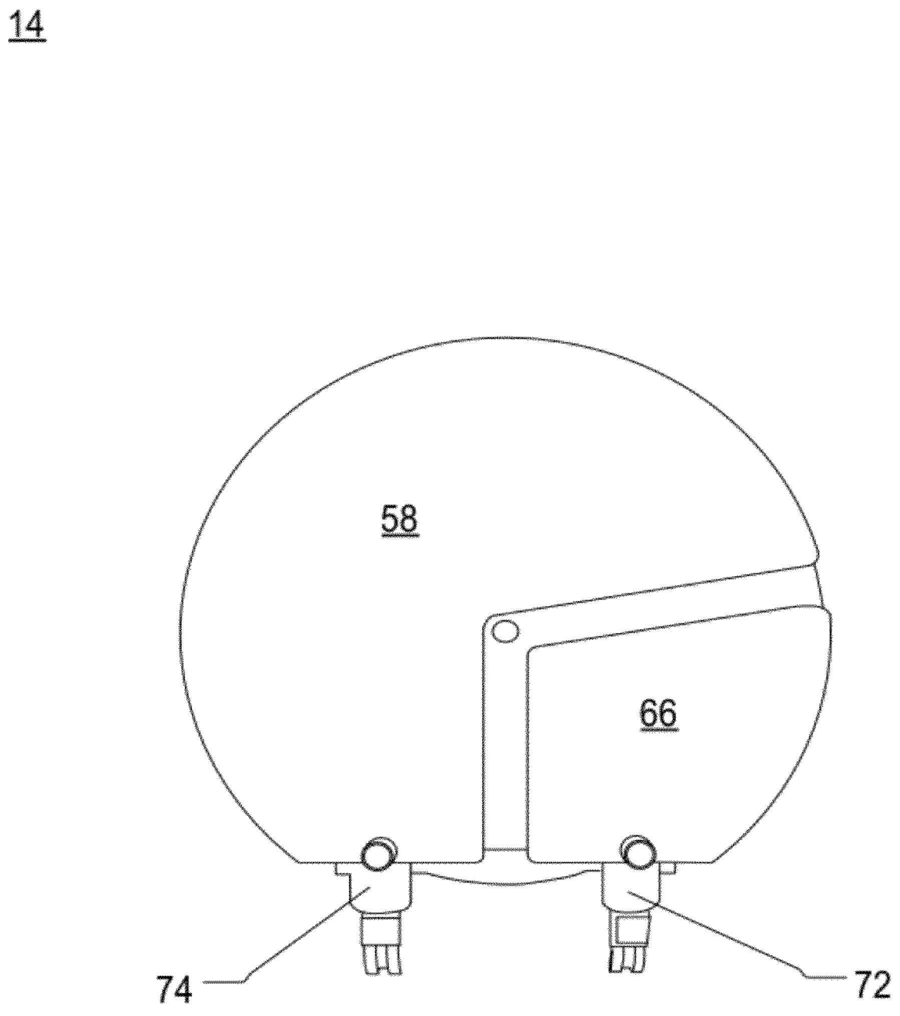
FIG. 7 is a partial cutaway bottom view of the water reservoir of the water dispensing apparatus of FIG. 1.
Figure 8:
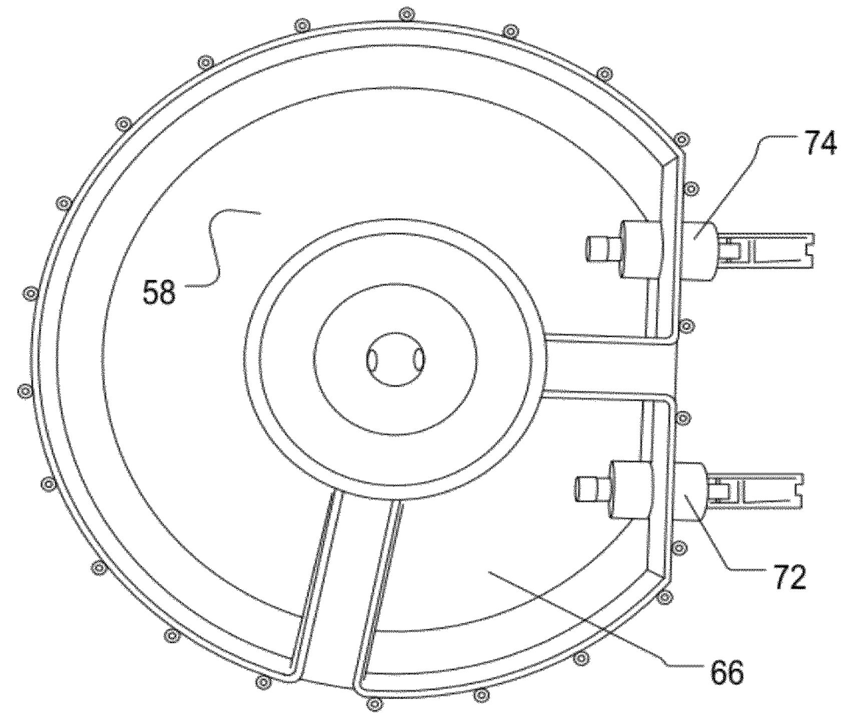
FIG. 8 is a partial cutaway top perspective view of part of the water dispensing apparatus of FIG. 1.
Figure 9:
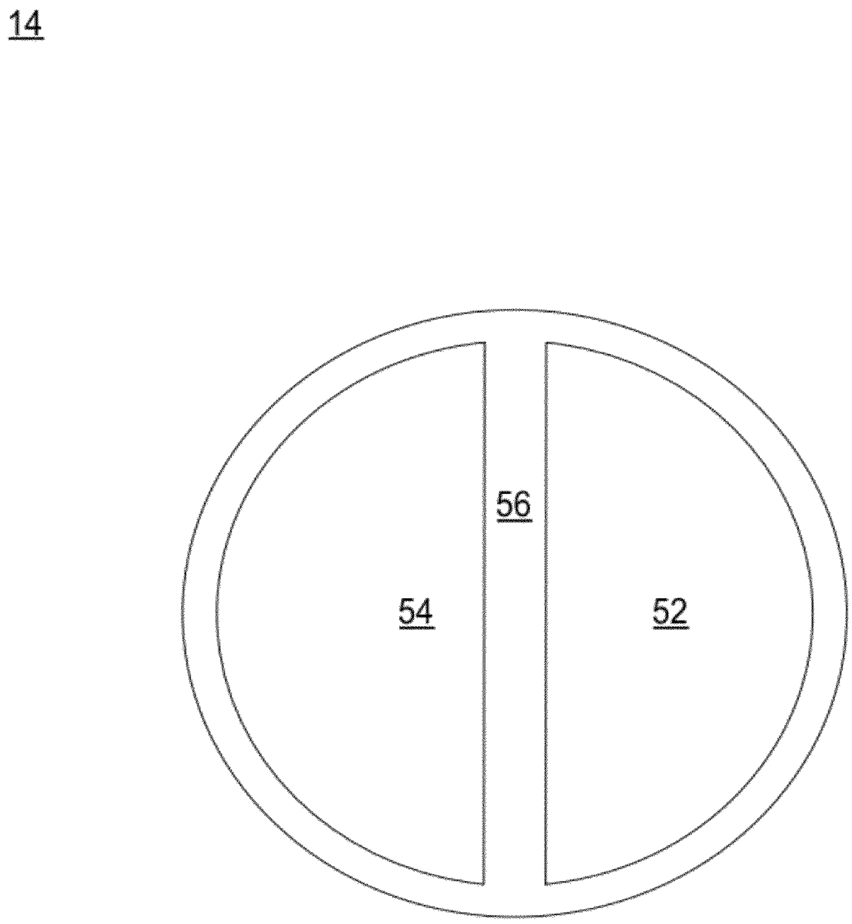
FIG. 9 illustrates an exemplary insulating system of the water dispensing apparatus of FIG. 1.

As shown throughout the various drawings, the dispensing area 46 is disposed near the bottom portion of the water reservoir 14 when in the upper position and includes one or more dispensing taps. In general, the water reservoir 14 comprises a heating system 52 and a cooling system 54. In a preferred embodiment, the dispensing area includes one hot water dispenser 72 and one cold water dispenser 74, as illustrated in FIG. 6. The hot water dispenser 72 has an opening through which water stored in a heating compartment 66 is dispensed, and the cold water dispenser 74 has an opening through which water stored in a cooling compartment 58 is dispensed. FIG. 7 is a bottom view of the heating compartment 66 and cooling compartment 58 of the water reservoir 14, and FIG. 8 is a top partial-cut-away view of the same. As seen in FIGS. 7-8, the hot water compartment 66 is smaller than the cold water compartment 58 and represents approximately 30% of the water storage capacity of the water reservoir 14. Preferably, as shown in FIG. 9, the water reservoir 14 includes an insulating system 56 that minimizes the transfer of heat between the heating system 52 and the cooling system 54.

Figure 10:
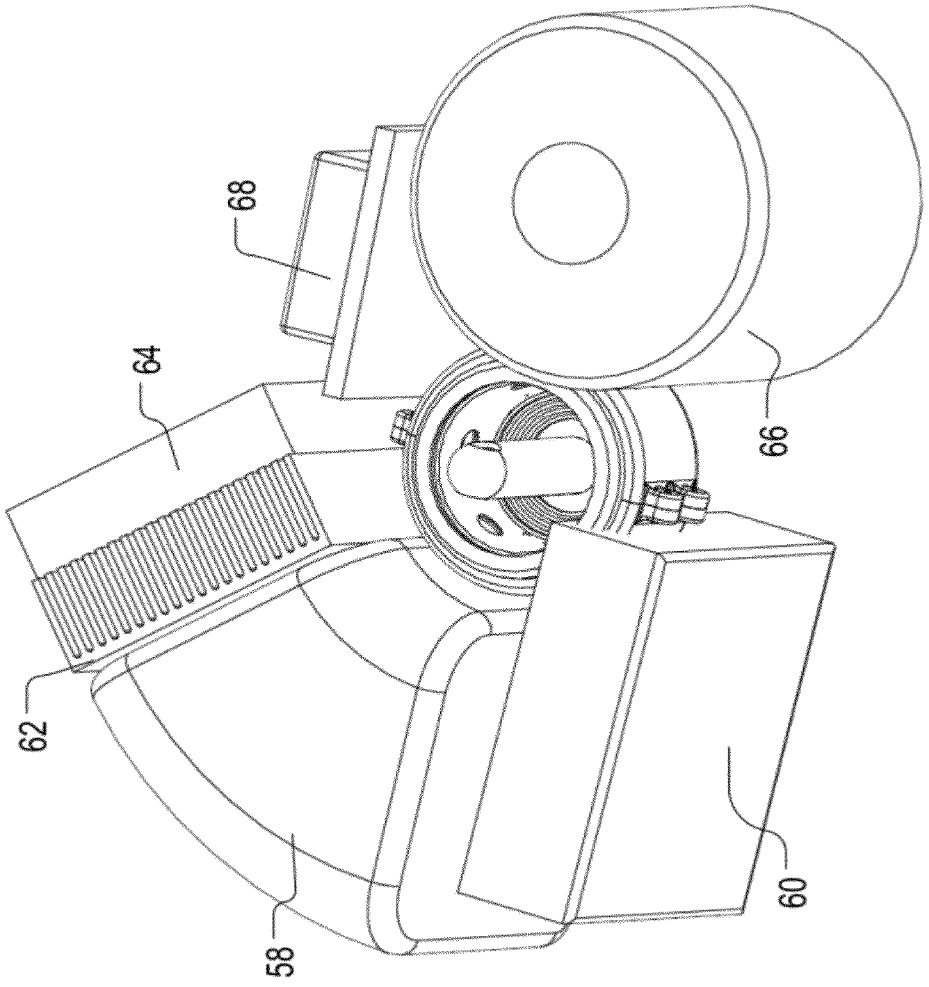
FIG. 10 is a schematic illustration of internal components housed within a water reservoir of another preferred embodiment of a water dispensing apparatus in accordance with one or more aspects of the present invention.

FIG. 10 is a schematic illustration of internal components housed within a water reservoir of a preferred embodiment of a water dispensing apparatus in accordance with one or more aspects of the present invention. The cooling system 54 comprises a cooling compartment 58, a cooling controller 60, and one or more Peltier elements 62. Once a water bottle 16 has been installed, water flows from the water bottle 16 to the cooling compartment 58 where the water is stored and cooled to the desired temperature. The cooling controller 60 contains electronics, including a thermostat, that monitor and regulate the temperature of the water contained within the cooling compartment 58. In a preferred embodiment, the thermostat can be set between 40-degress Fahrenheit and 60-degrees Fahrenheit. The one or more Peltier elements 62 are in contact with the cooling compartment 58 and function to cool the water to the desired temperature. As electricity flows through the one or more Peltier elements 62, heat is transferred from one side of the one or more Peltier elements 62 to the opposite side of the one or more Peltier elements 62. This phenomenon is known as the Peltier Effect. Through this process, water contained within the cooling compartment 58 is cooled to the desired temperature. A fan 64 may be used to dissipate the heat generated by the one or more Peltier elements 62.

In at least one preferred embodiment of the present invention, the heating system 52 comprises a heating compartment 66, a heating controller 68, and a heating element. Once a water bottle 16 has been installed, water flows from the water bottle 16 into the heating compartment 66 where the water is stored and heated to the desired temperature. The heating controller 68 contains electronics, including a thermostat, that monitor and regulate the temperature of the water contained within the heating compartment 66. In a preferred embodiment, the thermostat can be set between 155 degrees Fahrenheit and 200 degrees Fahrenheit. As electricity flows through the heating element 70, heat is transferred to the water within the heating compartment 66, heating water therein to a desired temperature.

Figure 12:
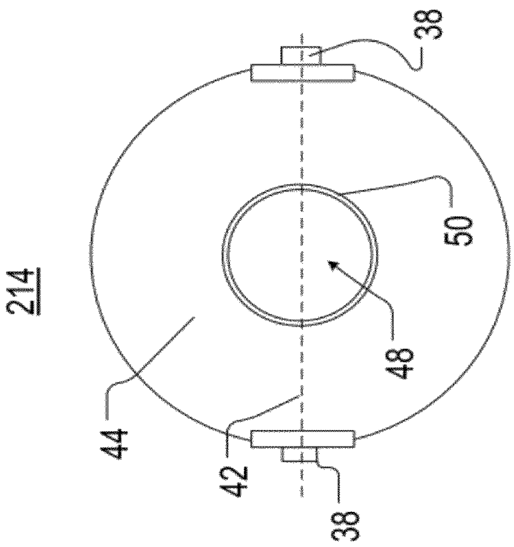
FIG. 12 is a top plan view of the water reservoir of FIG. 11.
Figure 11:
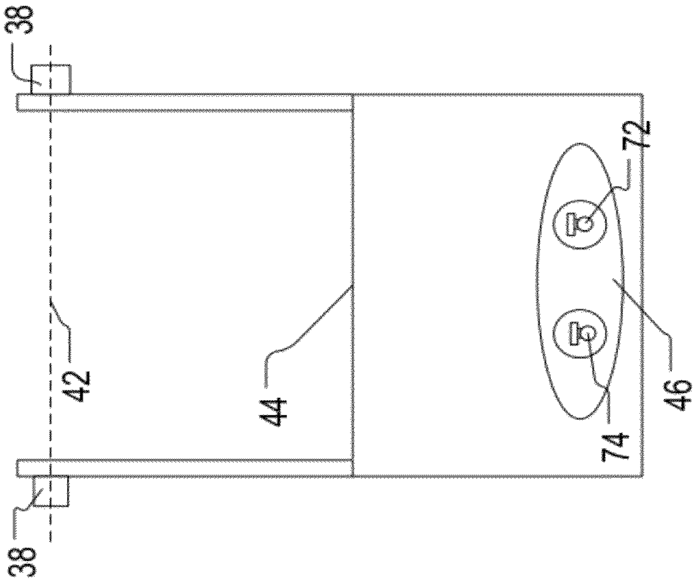
FIG. 11 is a front plan view of a water reservoir of another preferred embodiment of a water dispensing apparatus in accordance with one or more aspects of the present invention.

FIG. 11 is a front plan view of a water reservoir 214 of another preferred embodiment of a water dispensing apparatus in accordance with one or more aspects of the present invention, and FIG. 12 is a top plan view of the water reservoir 214. Water reservoir 214 is similar in design and construction to water reservoir 14.

Figure 13:
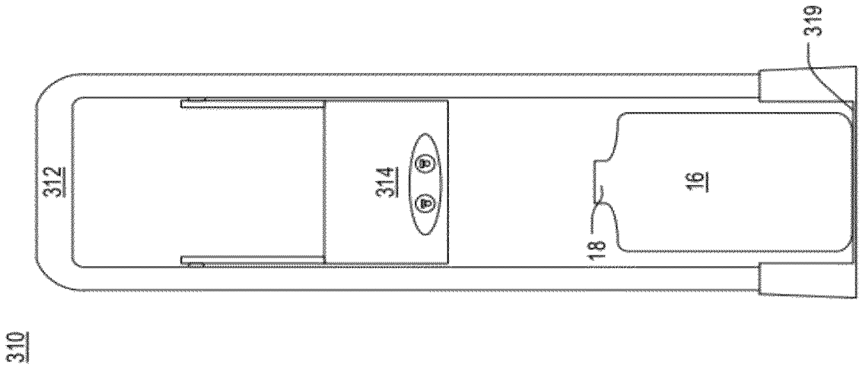
FIG. 13 is a schematic illustration of another preferred embodiment of a water dispensing apparatus and associated method in accordance with one or more aspects of the present invention, in which the water reservoir is shown in a raised position.

FIGS. 13-18 demonstrate a method by which a water bottle 16 is installed in water dispensing apparatus 310 in accordance with least one preferred embodiment of the present invention. In particular, while the water dispensing apparatus 310 is in the raised configuration, a user places a water bottle 16 in an upright orientation onto the base 319, with the neck 18 of the bottle 16 facing upward as shown in FIG. 13. The user next transitions the apparatus 310 from the raised configuration to the lowered configuration by pressing a button. In alternative embodiments, the transition between configurations may be accomplished by flipping a switch, turning a knob, or other similar methods.

Figure 15:
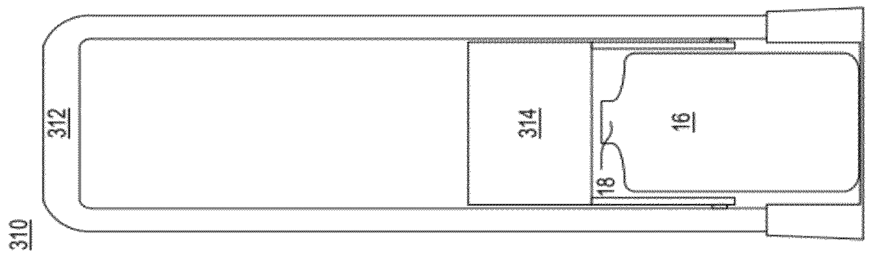
FIG. 15 is a schematic illustration of the preferred embodiment of FIG. 13, showing the water reservoir in a lower position prior to coupling with water bottle.
Figure 14:
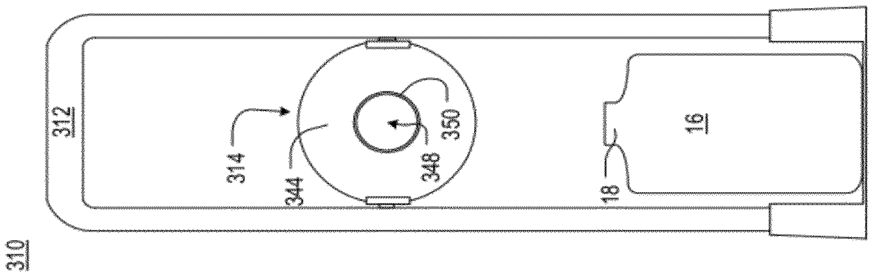
FIG. 14 is a schematic illustration of the preferred embodiment of FIG. 13, showing the water reservoir in transition from the raised position toward a lower position.
Figure 18:
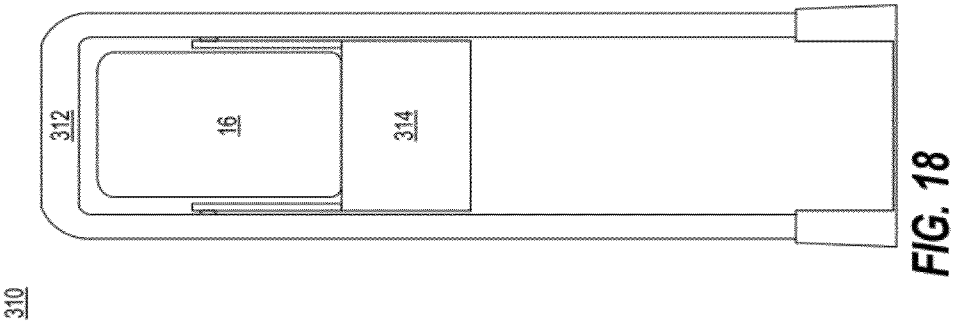
FIG. 18 is a schematic illustration of the preferred embodiment of FIG. 13, in which the water reservoir is shown in the raised position, with a water bottle coupled therewith.
Figure 17:
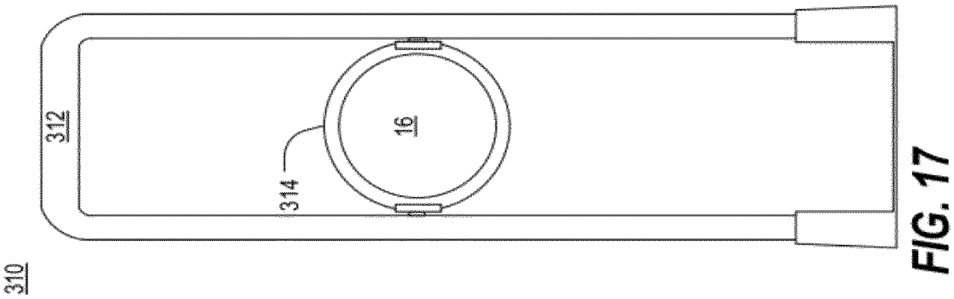
FIG. 17 is a schematic illustration of the preferred embodiment of FIG. 13, in which the water reservoir is shown transitioning from the lower position to the raised position, with a water bottle coupled therewith.
Figure 16:
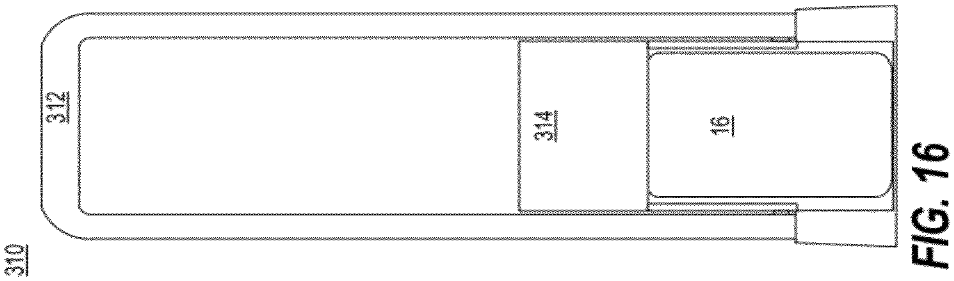
FIG. 16 is a schematic illustration of the preferred embodiment of FIG. 13, in which the water reservoir is shown in a lower position with a water bottle coupled therewith.

As the apparatus 310 transitions, shown in FIGS. 14 and 15, the water reservoir 314 rotates and lowers onto the neck 18 of the water bottle 16 such that the bottle receiving area 344 is aligned with the neck 18 of the bottle 16. A sensor within the apparatus 310 detects the presence of the bottle 16 and securely grabs the bottle 16 about the neck 18, forming a watertight seal. Once the water bottle 16 is secured, the water reservoir 314 begins to move upward and rotates, returning to the raised configuration, as shown in FIG. 18, wherein the water cooler bottle is inverted (i.e., is in an upside-down orientation).

It will be appreciated that a water bottle 16 can be unloaded in a similar fashion. First, the apparatus 310 with a first bottle installed transitions from a raised configuration to a lowered configuration. Once the apparatus 310 reaches the lowered configuration, the installed first bottle is released from the water reservoir 314 onto the base 319. A user then removes the first bottle and replaces it with a second bottle. The apparatus 314 securely grabs the second bottle about the neck and returns to the raised configuration.

Furthermore, during the interchanging of the full and empty water cooler bottles, the lifting system may raise the water reservoir slightly to facilitate removal of the empty water cooler bottle and placement of the full water cooler bottle. Such a slightly raised configuration is show in FIG. 15 and is in contrast to the lowered configuration shown in FIG. 16.

Figure 19:
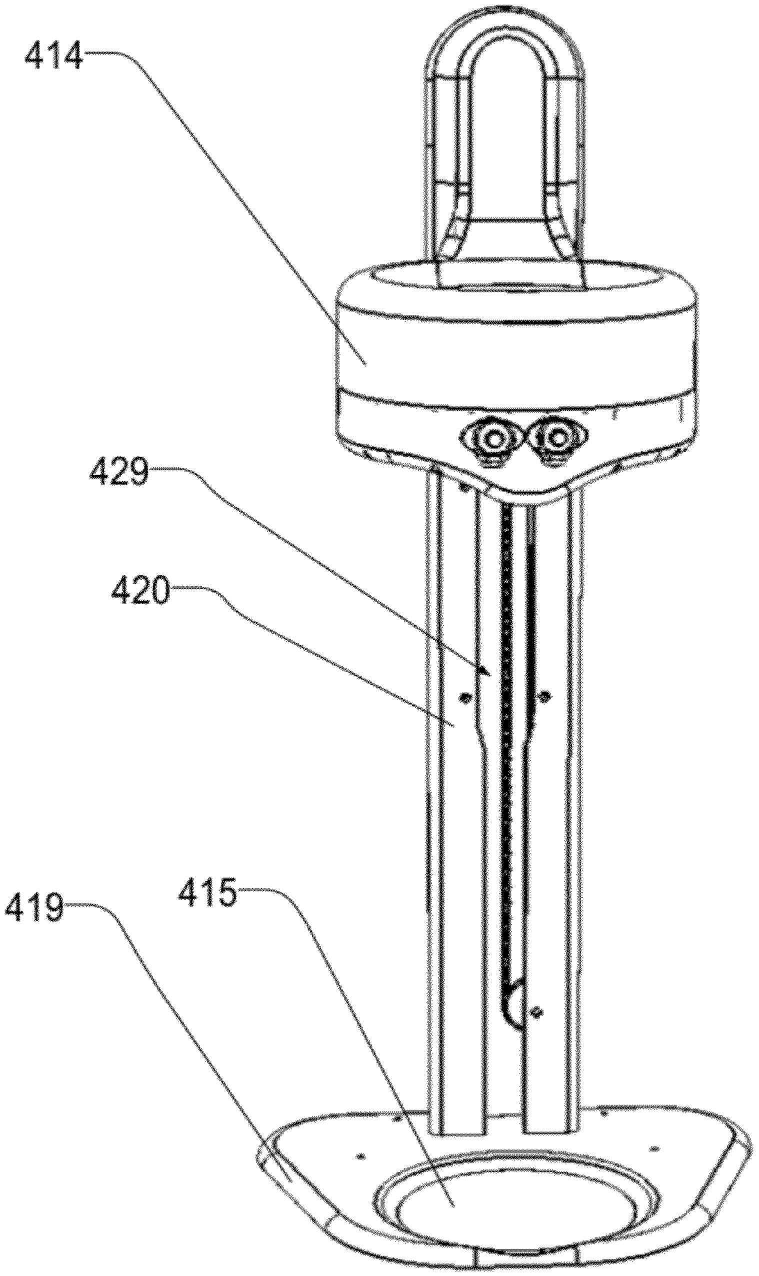
FIG. 19 illustrates a water dispensing apparatus in accordance with another preferred embodiment of the invention.
Figure 20:
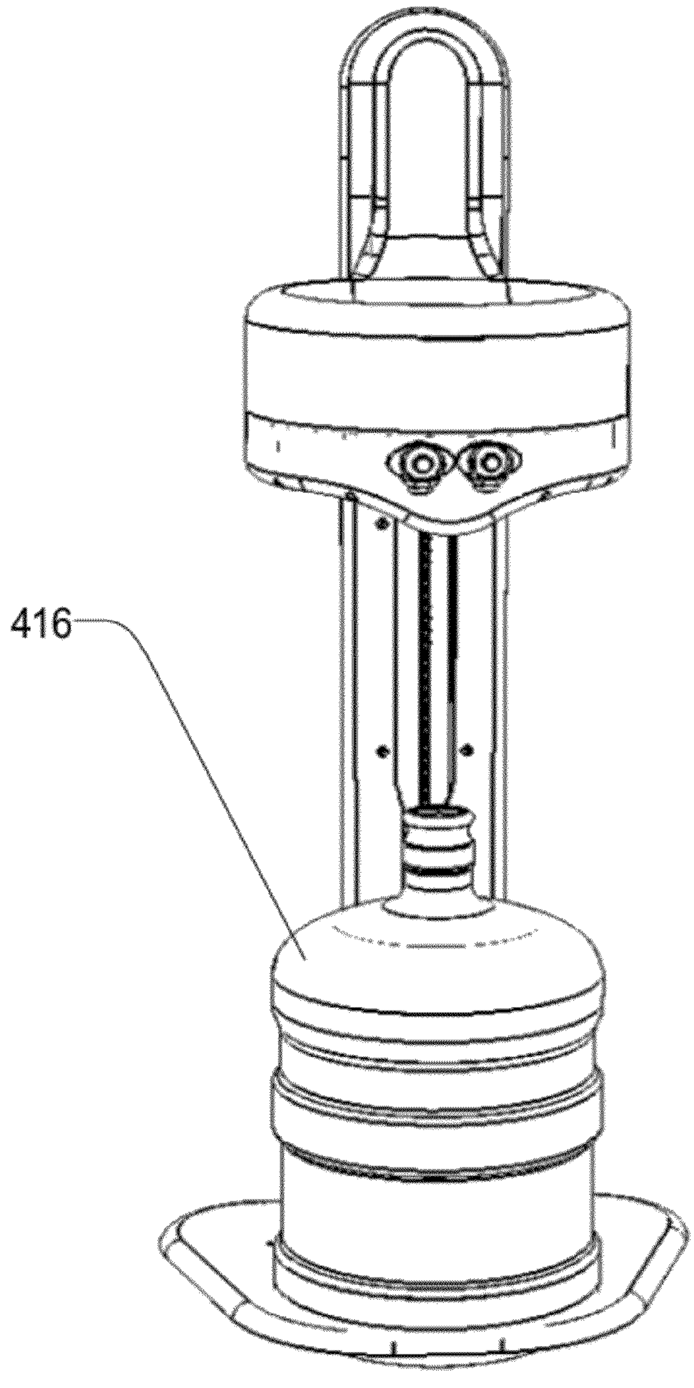
FIG. 20 illustrates the water dispensing apparatus of FIG. 19 together with a water bottle located within a bottle loading area of a base of the lifting system.

FIG. 19 illustrates yet another water dispensing apparatus 410 in accordance with another preferred embodiment of the invention. The water dispensing apparatus 410 is configured to facilitate easy loading of a water bottle. Specifically, the water dispensing apparatus 410 is configured to effect loading of a water bottle that has been placed in a bottle loading area 415 of a base 419 of the water dispensing apparatus. As illustrated, the base 419 includes a specifically contoured surface that receives and conforms to the bottom of the water cooler bottle for precise locating of the water bottle relative to the water reservoir when the water reservoir is lowered down onto the neck of the water bottle. FIG. 20 illustrates the water dispensing apparatus 410 together with a water bottle 416 properly seated in the bottle loading area 415 of the base 419.

The water dispensing apparatus 410 further includes an extruded frame 420 extending upward therefrom, and a water reservoir 414 disposed generally vertically above the base 419. Mechanical components (described in more detail hereinbelow) disposed within the frame 420 support the water reservoir 414 during both vertical translation of the water reservoir 414 rotation of the water reservoir 414.

FIGS. 21-28 illustrate a sequence whereby the water cooler bottle 416 disposed in the bottle receiving area 415 of the base is secured by the water reservoir 414 and transitioned from such lower position to an inverted, raised position for dispensing water.

Figure 21:
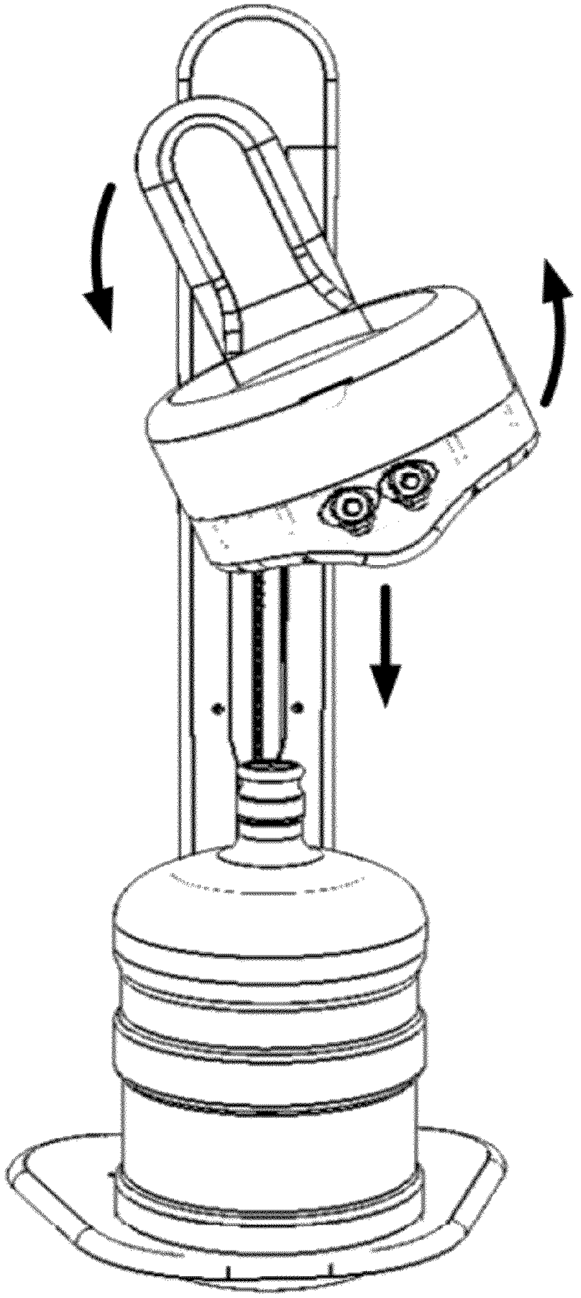
FIGS. 21-28 illustrate a sequence whereby a water bottle located in the bottle receiving area of the water dispensing apparatus of FIG. 19 is secured by the water reservoir and transitioned from such lower position to an inverted, raised position for dispensing of water.
Figure 22:
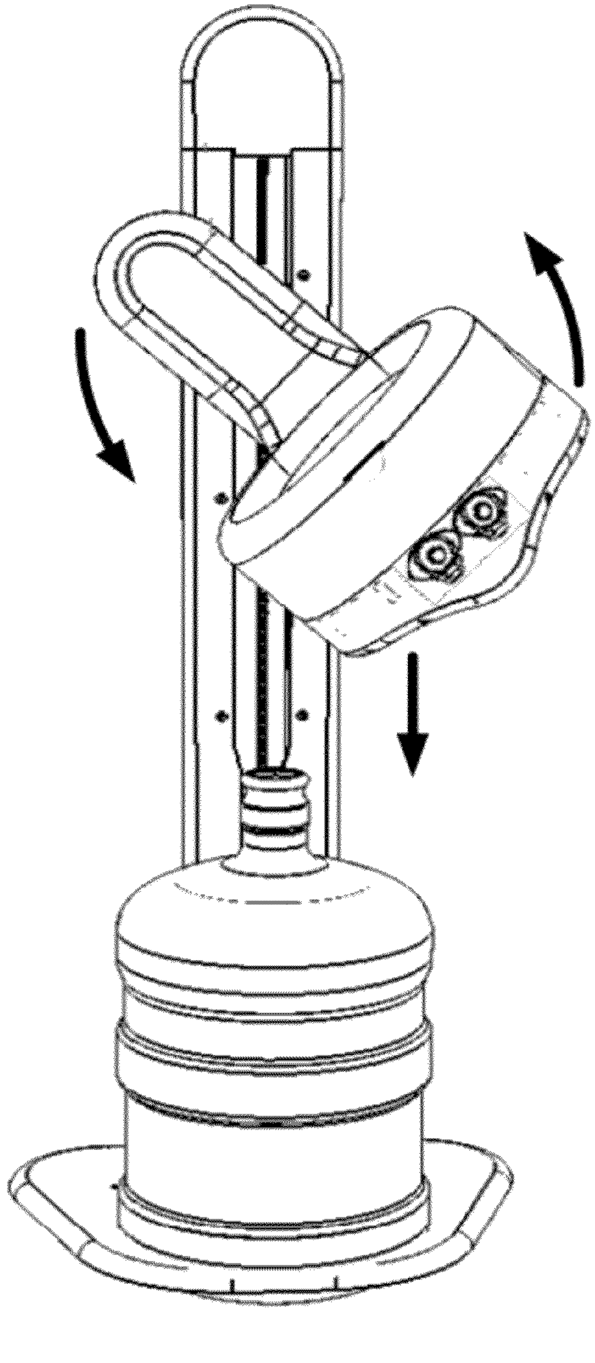
Figure 23:
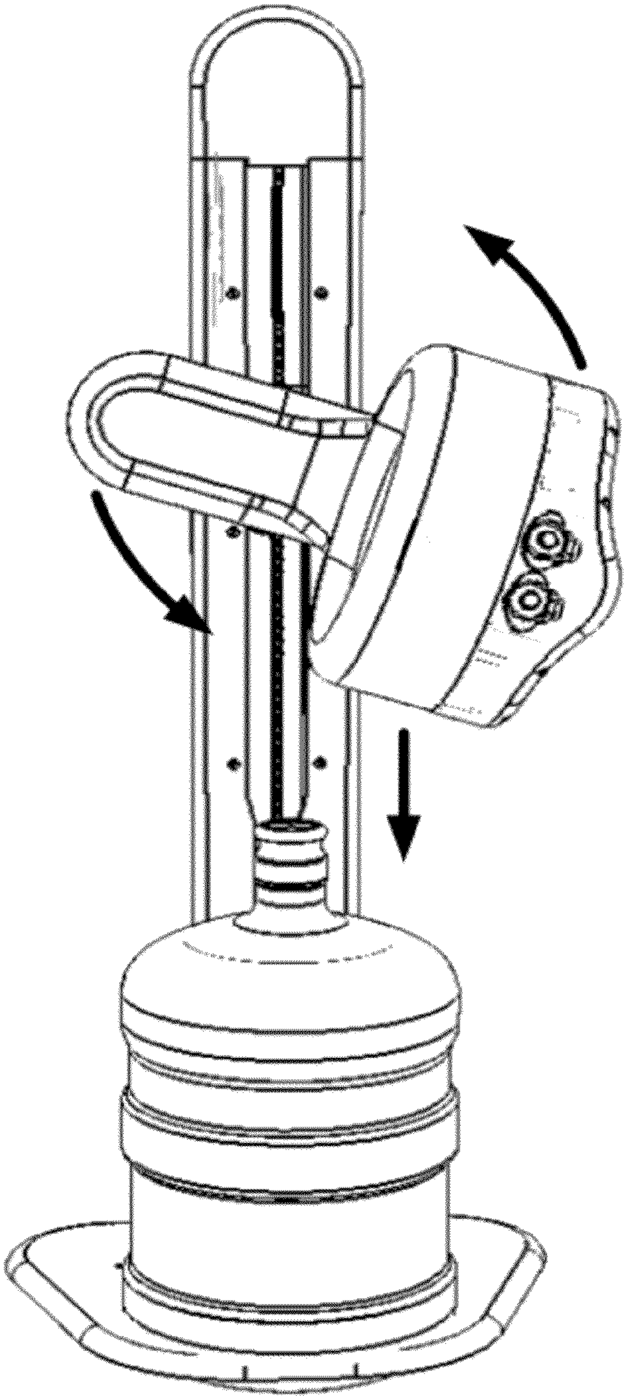
Figure 24:
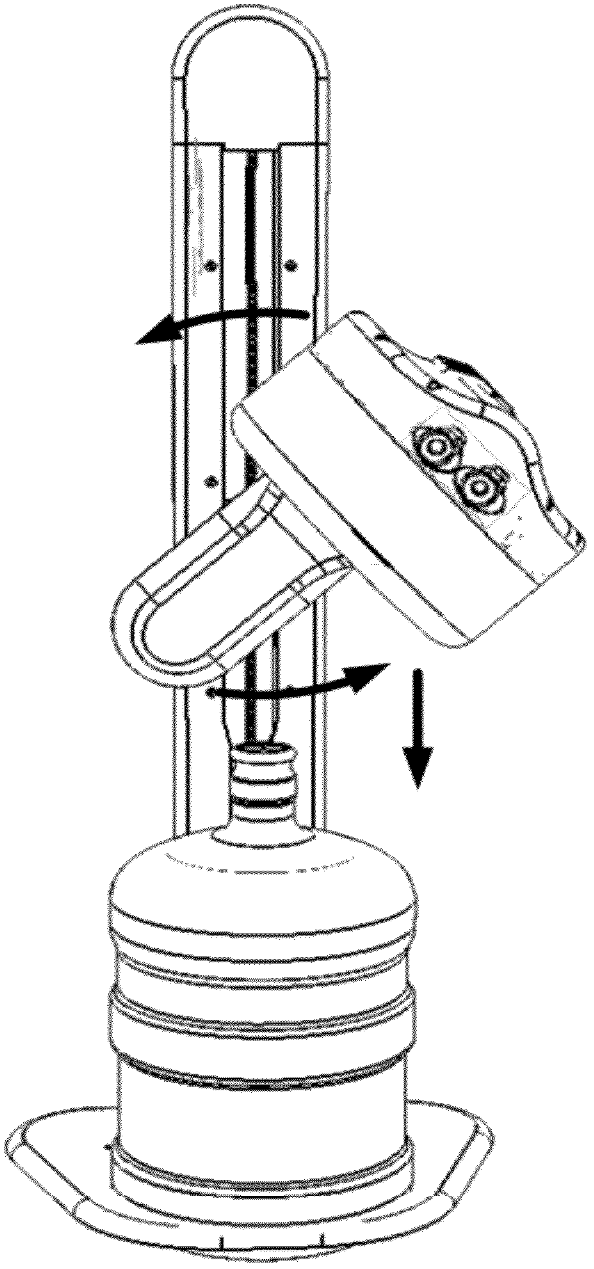
Figure 25:
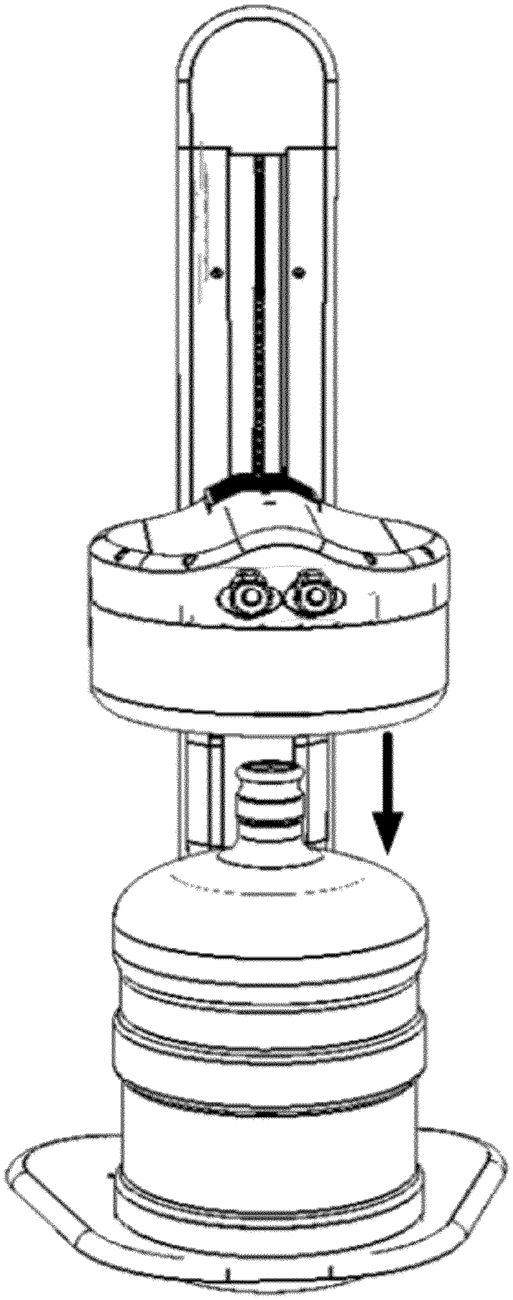
Figure 26:
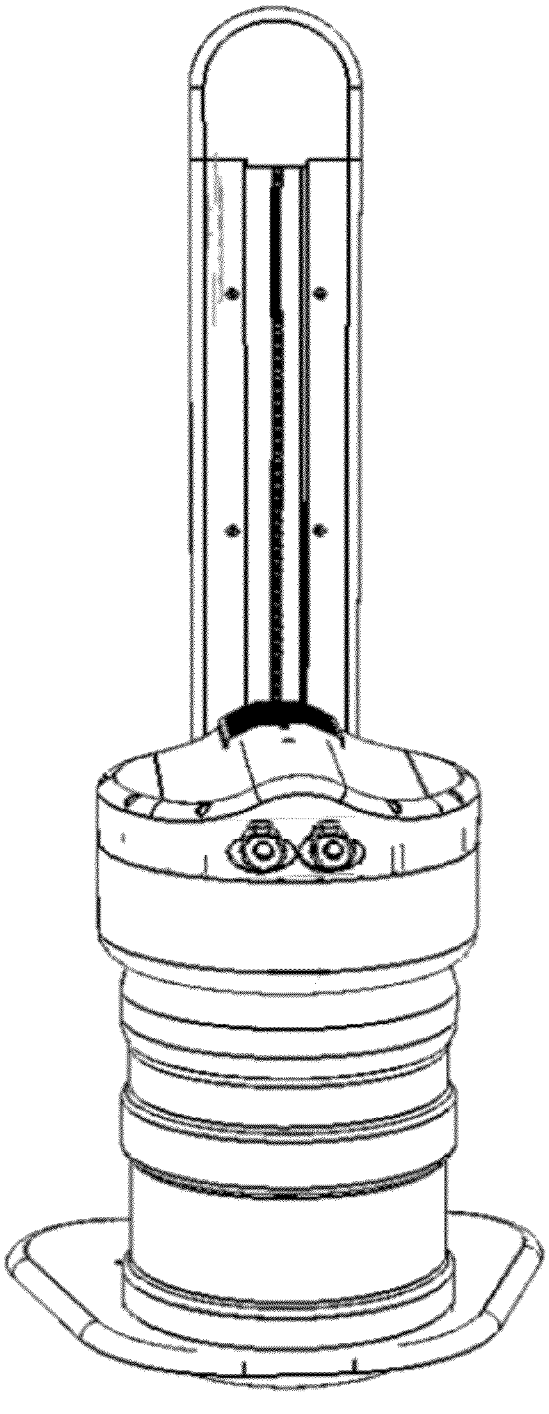

First, the water reservoir 414 begins to descend vertically and simultaneously rotate, as illustrated in FIG. 21. The water reservoir 414 continues to simultaneously descend and rotate until it has rotated one hundred and eighty degrees, at which point it will be prevented from rotating any further (as described in more detail hereinbelow), but will continue to descend, as illustrated in FIG. 25. Once the water reservoir 414 has completed its descent, a neck of the water cooler bottle 416 will be disposed within a receiving aperture of a bottle receiving area of the water reservoir 414. Mechanical components (described in more detail hereinbelow) disposed within the water reservoir 414 will grasp the neck of the water cooler bottle 416 to secure it to the water reservoir 414.

Figure 27:
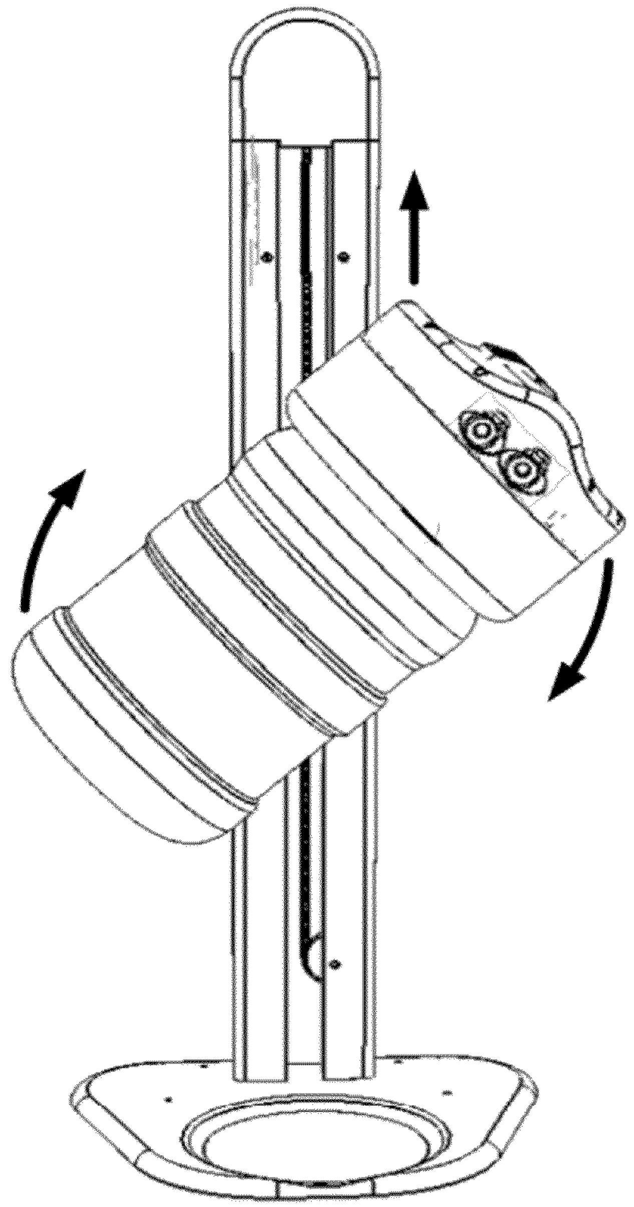
Figure 28:
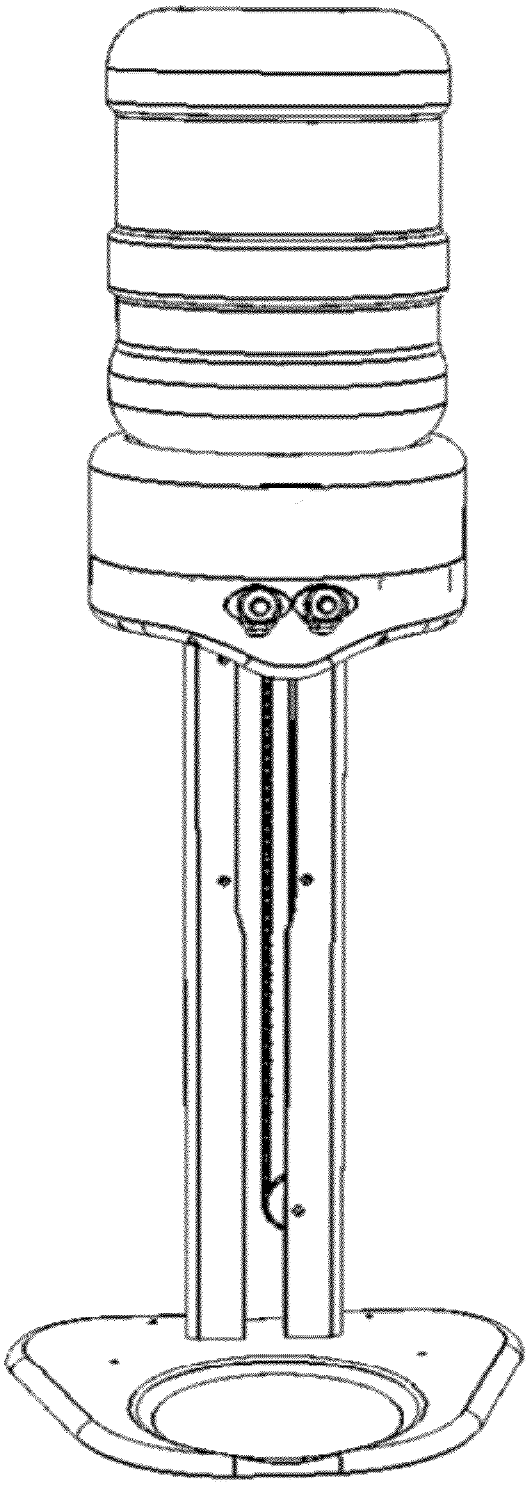
Figure 29:
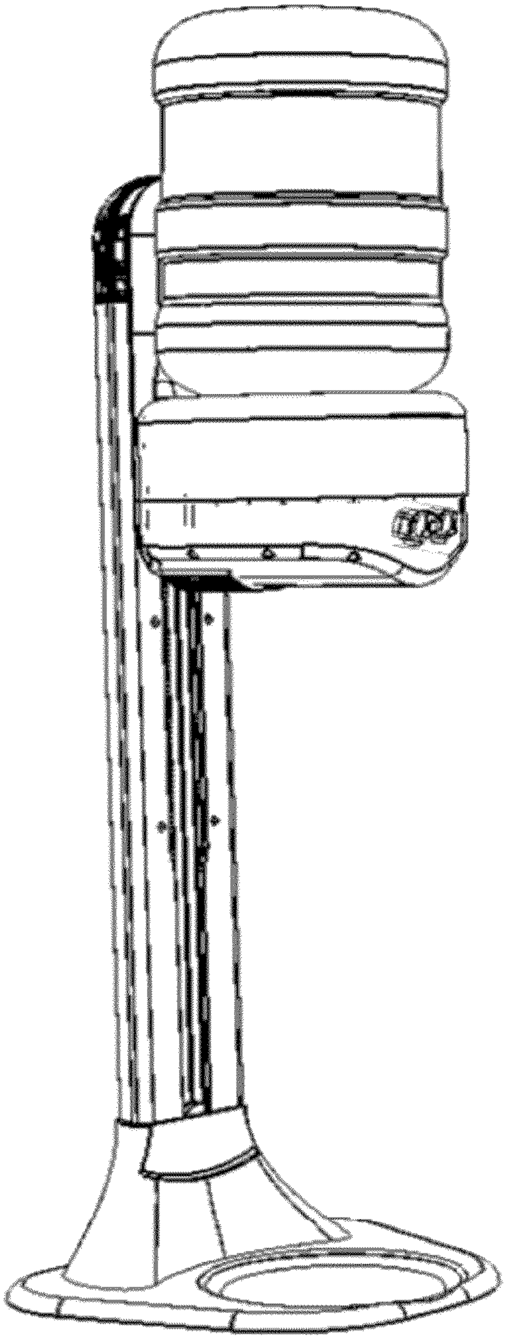
FIG. 29 is a perspective view of the water dispensing apparatus of FIG. 19.

With the water bottle 416 securely coupled with the water reservoir 214, the water reservoir 414 ascends, taking the secured water cooler bottle 416 with it. This process is the reverse of the descent process. Thus, at first, the water reservoir 414 secured water bottle 416 only ascend, but do not rotate. However, shortly after beginning the ascent, the water reservoir 414 and water bottle 416 rotate as well, as illustrated in FIG. 27. Specifically, the water reservoir 414 and the water bottle 416 rotate one hundred and eighty degrees during the ascent. Once this ascent is completed, the water bottle 416 is located in the dispensing position atop the water reservoir 414, as illustrated in FIGS. 28 and 29.

Figure 30:
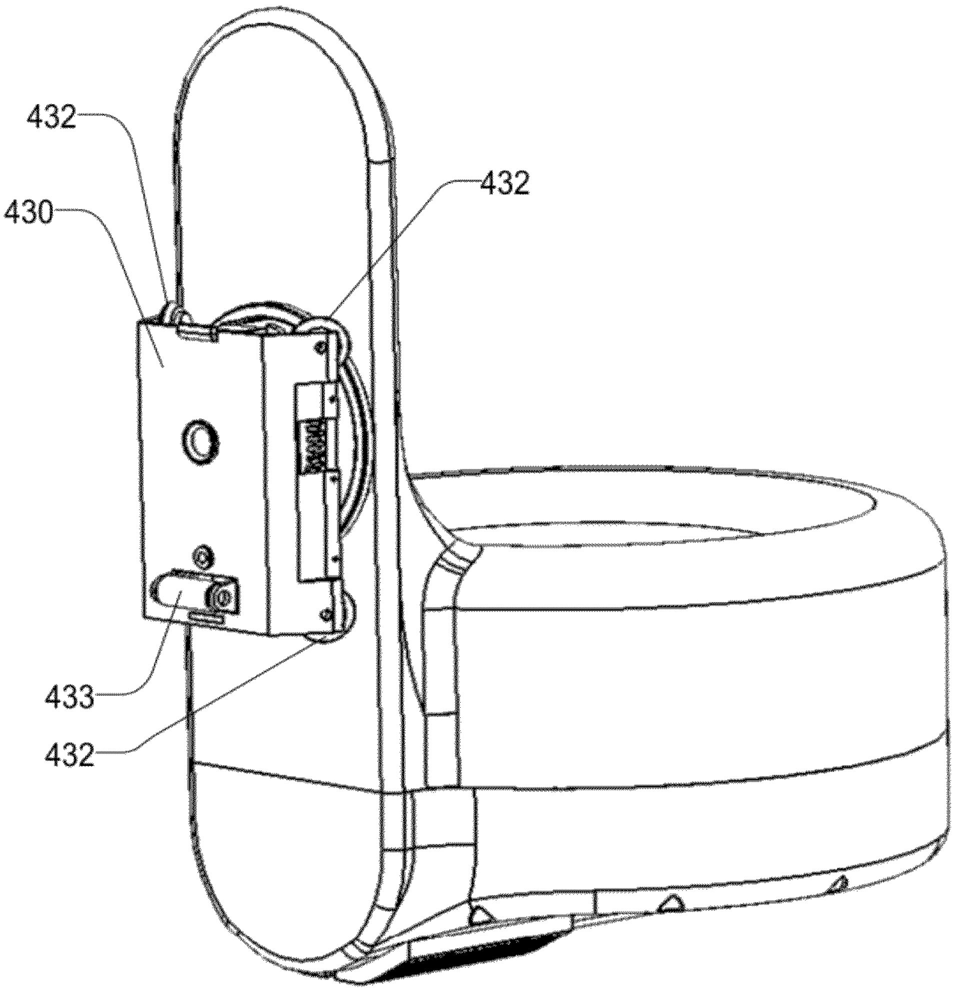
FIGS. 30-31 illustrate the coupling between the carriage and the water reservoir of the water dispensing apparatus of FIG. 19.
Figure 31:
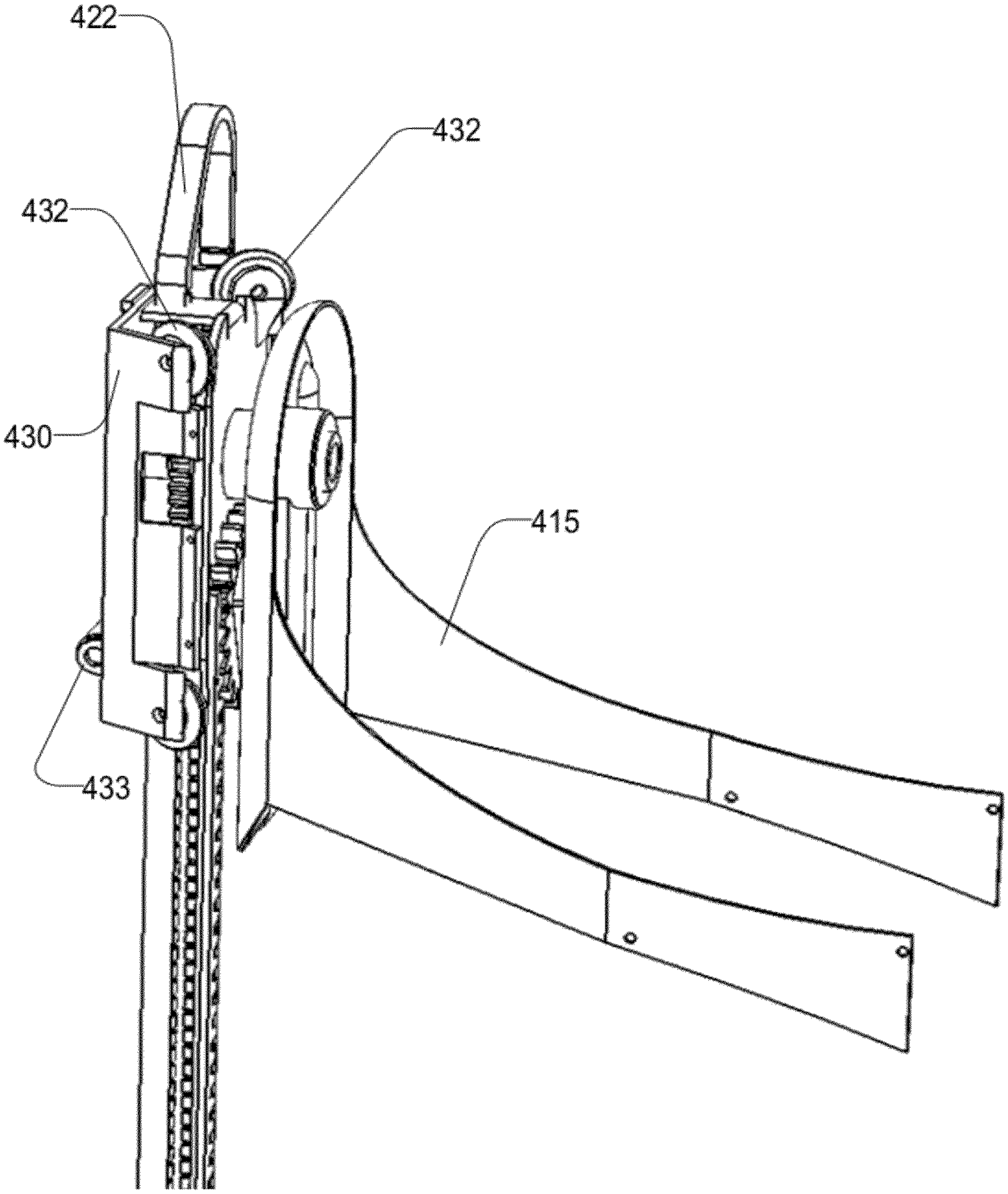
Figure 32:
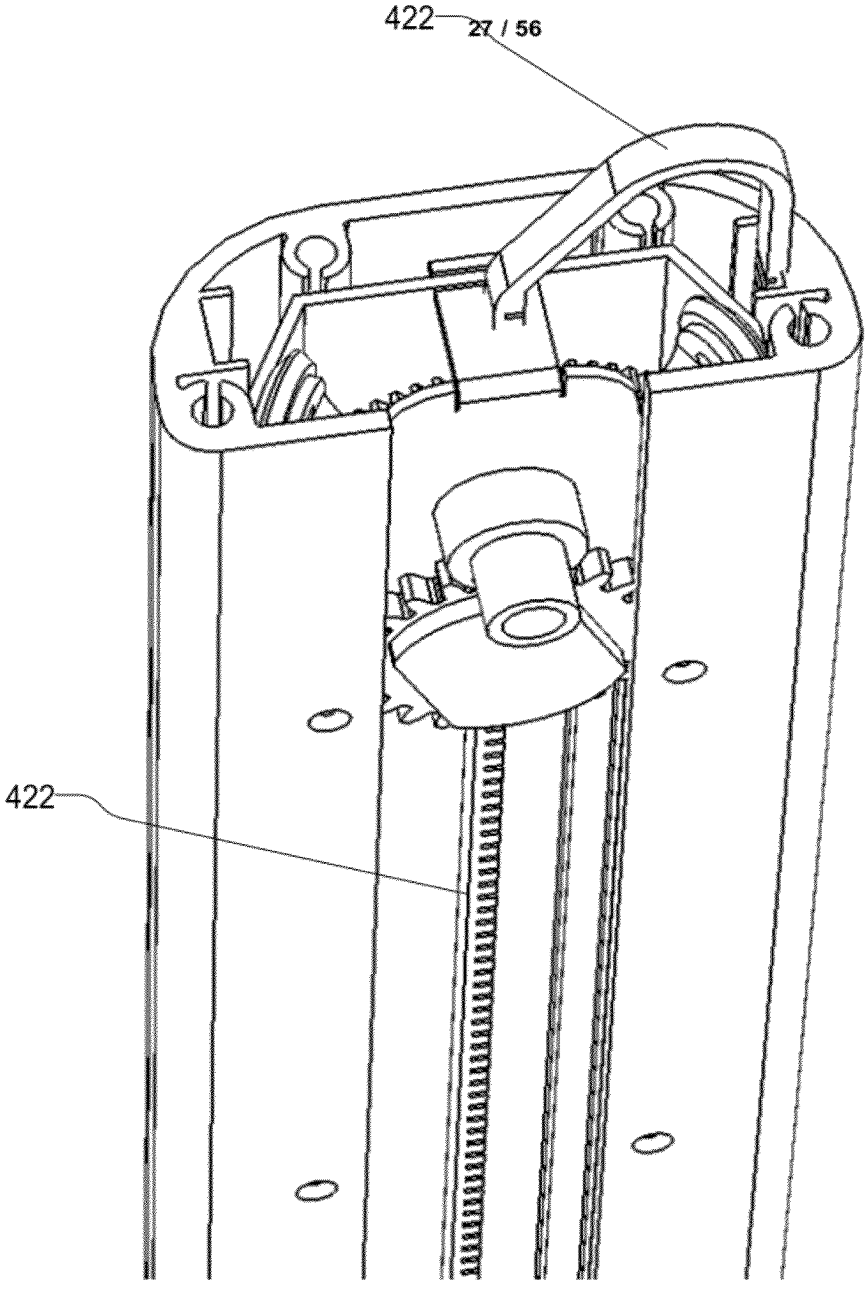
FIG. 32 illustrates the carriage located within a frame of the water dispensing apparatus of FIG. 19.

Movement of the water reservoir 414 during its ascent and descent is facilitated by a carriage 430 located within the frame 420 that traverses along a track. The carriage 430 is coupled to the water reservoir 414 as illustrated in FIG. 30, and, specifically, to a chassis 415 of the water reservoir 414, as illustrated in FIG. 31. The carriage 430 is configured to translate vertically up and down within the frame 420. FIG. 32 illustrates the carriage 430 disposed within the frame 420 near a top of the frame 420 (a cap and other components normally disposed on top of the extruded frame 420 have been omitted from this figure for clarity).

Figure 33:
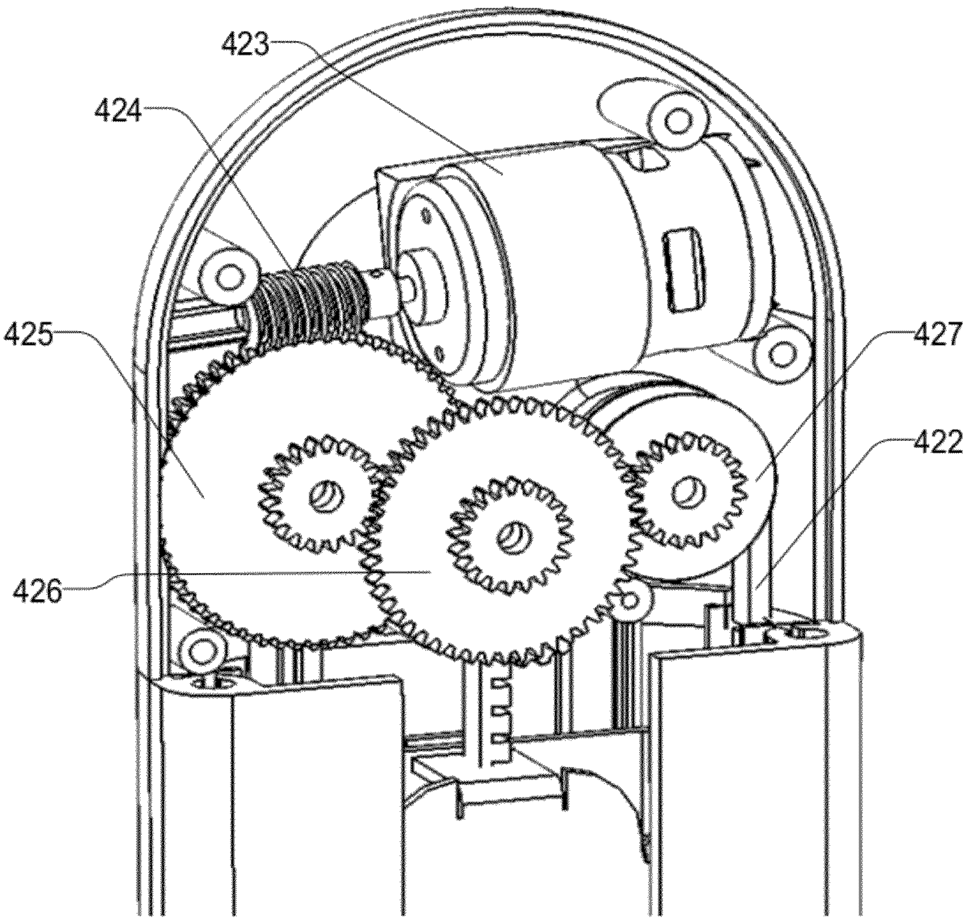
FIG. 33-34 illustrate components configured to effect transversal of the carriage along a track.
Figure 34:
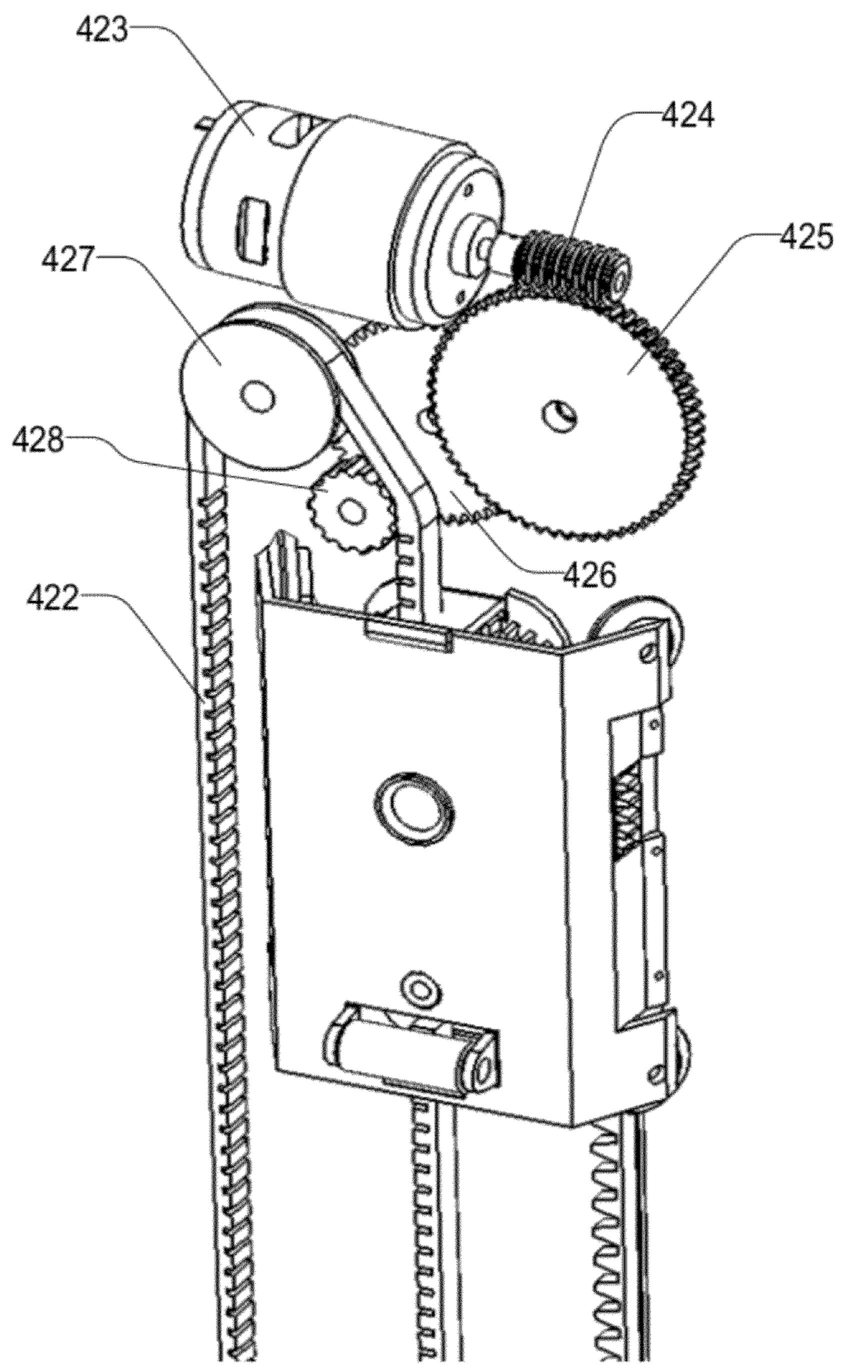

The carriage 430 includes four angled wheels 432 on a first side thereof, and a single wider roller 433 on the opposite side thereof. The angled wheels 432 and the roller 433 allow the carriage 430 to roll within frame 420. The angled wheels 432 serve to maintain alignment of the carriage 430 precisely with a center-line of the extruded frame 420, and further distribute load to the front of the frame 420. The carriage 430 is driven by a timing belt 422 that is secured at top and bottom belt mounts of the carriage 430. The timing belt 422 is driven by a winch motor 423 facilitated by a drive worm 424, a worm wheel 425, a spur gear 426, and a timing pulley 427, as illustrated in FIG. 33. FIG. 34 illustrates the same components from an opposite side without the extruded frame 420. As illustrated in FIG. 34, an idler pulley 428 serves to guide the timing belt 422 as well. Another pulley for the timing belt 422 is disposed proximate the bottom of the frame, as can be seen in FIG. 28.

Figure 36A:
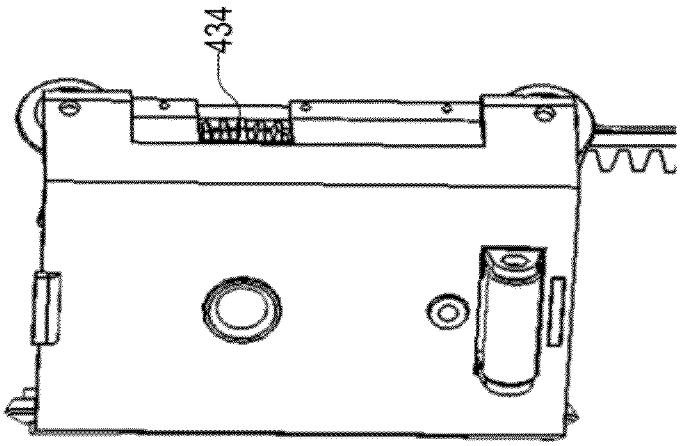
FIGS. 36A-C illustrate engagement of the pinion with a splined gear.
Figure 35:
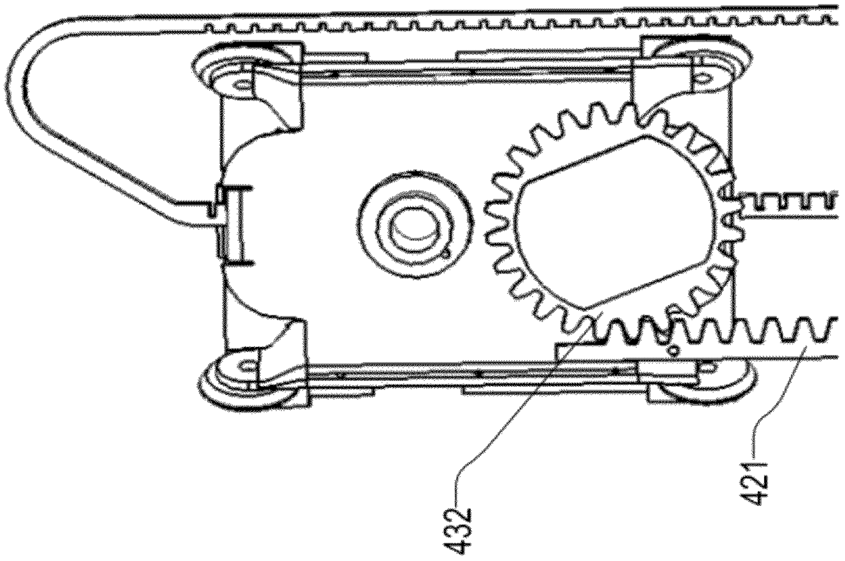
FIG. 35 illustrates engagement of a pinion of the carriage with a rack disposed within the frame.
Figure 36C:
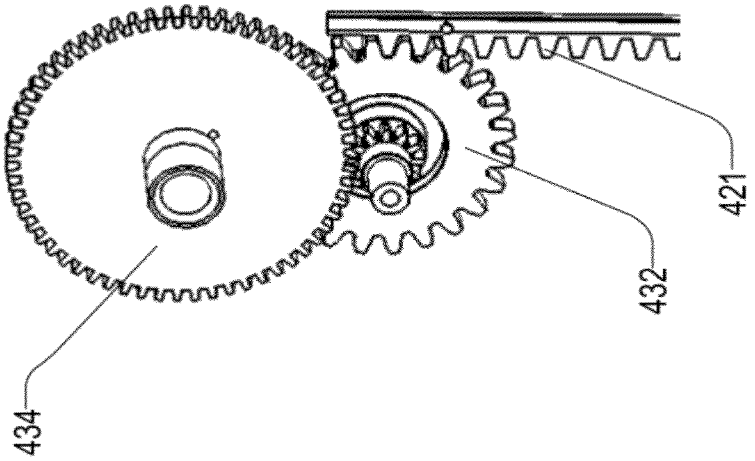
Figure 36B:
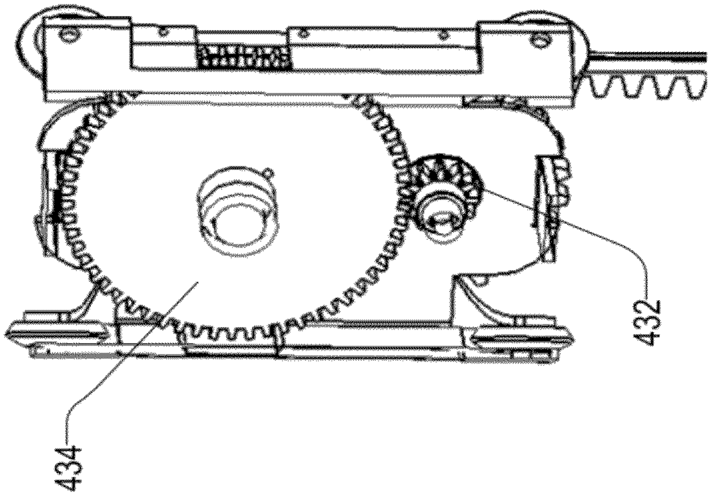

The carriage 430 includes a pinion 432 which is configured to engage a rack 421 disposed within the frame 420 along the track, as illustrated in FIG. 35. The rack 421 is traversed by the carriage 430. FIG. 36A illustrates the reverse side of the carriage 430 from that illustrated in FIG. 35. The carriage 430 further includes a splined gear 434 configured to engage the pinion 432, as illustrated in FIG. 36B (in which a portion of the carriage 430 has been omitted for clarity) and in FIG. 36C (in which only the pinion 432, splined gear 434, and rack 421 are illustrated).

Figure 37B:
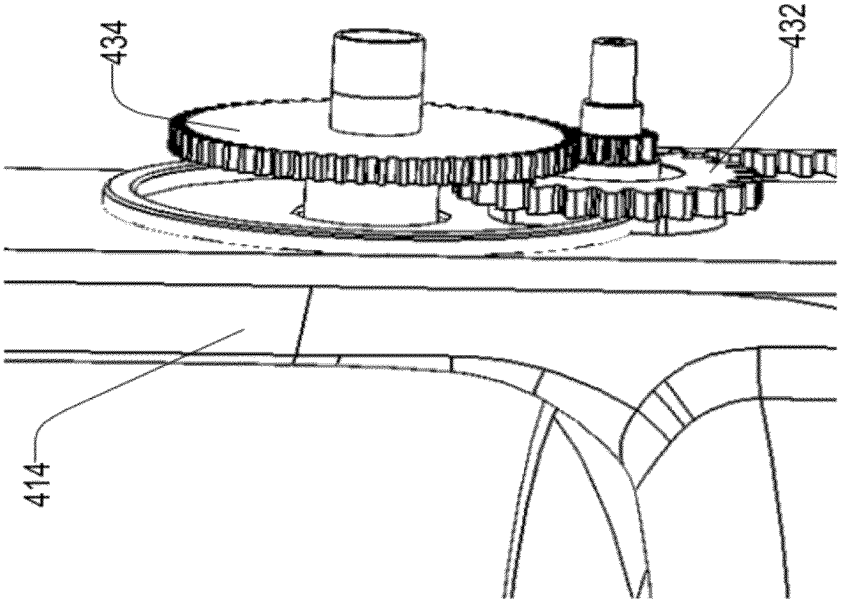
FIGS. 37A-B illustrate that mounting of the water reservoir to the splined gear.
Figure 37A:
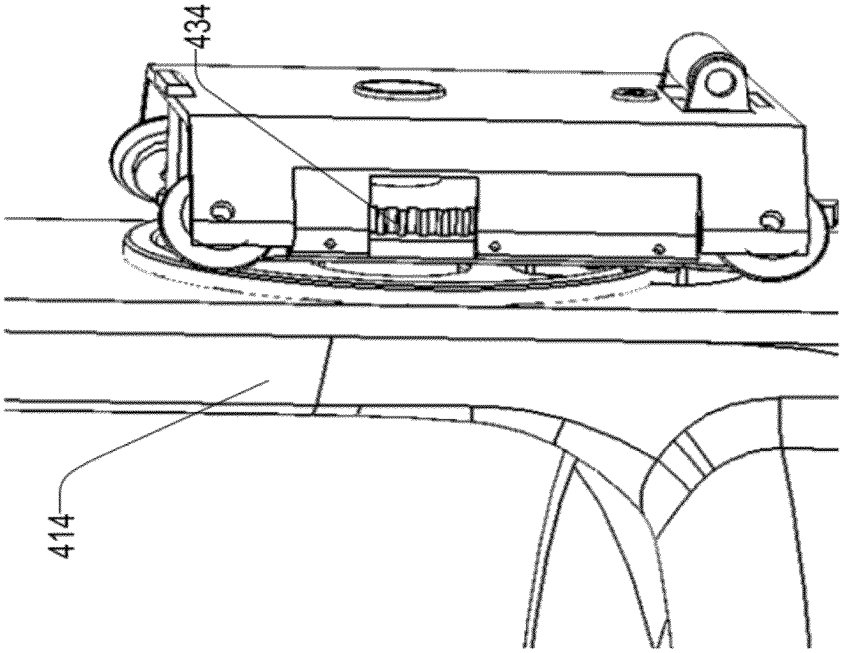

The water reservoir 414 is mounted to the splined gear 434, as can be seen via reference to FIG. 37A (in which the carriage 430 is illustrated) and FIG. 37B (in which only the splined gear 434 and pinion 432 are illustrated). As will be apparent, the water reservoir 414 translates and rotates together with the splined gear 434.

Figure 38A:
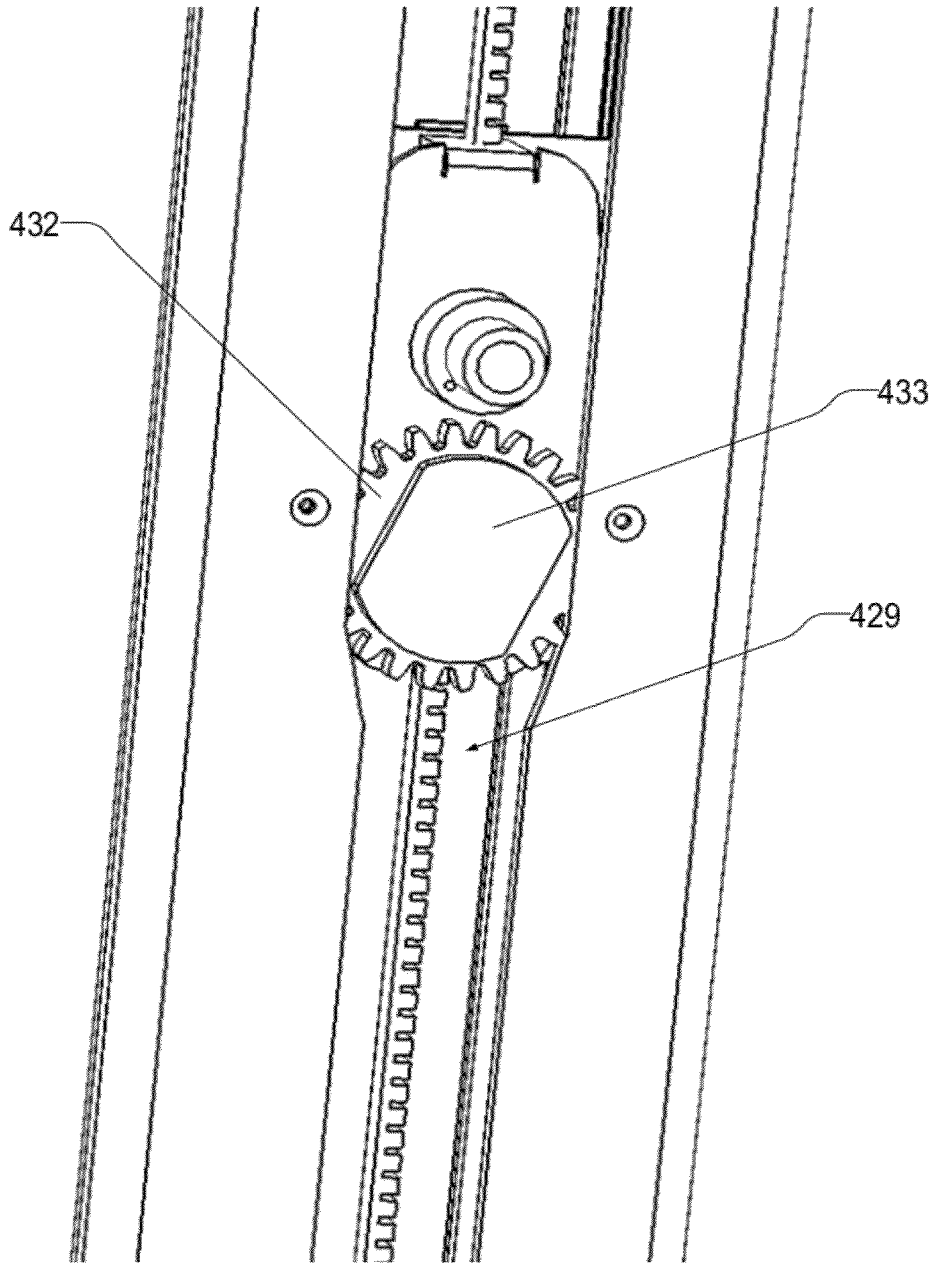
FIGS. 38A-B illustrate how a channel of the extruded frame constrains rotation of the pinion.
Figure 38B:
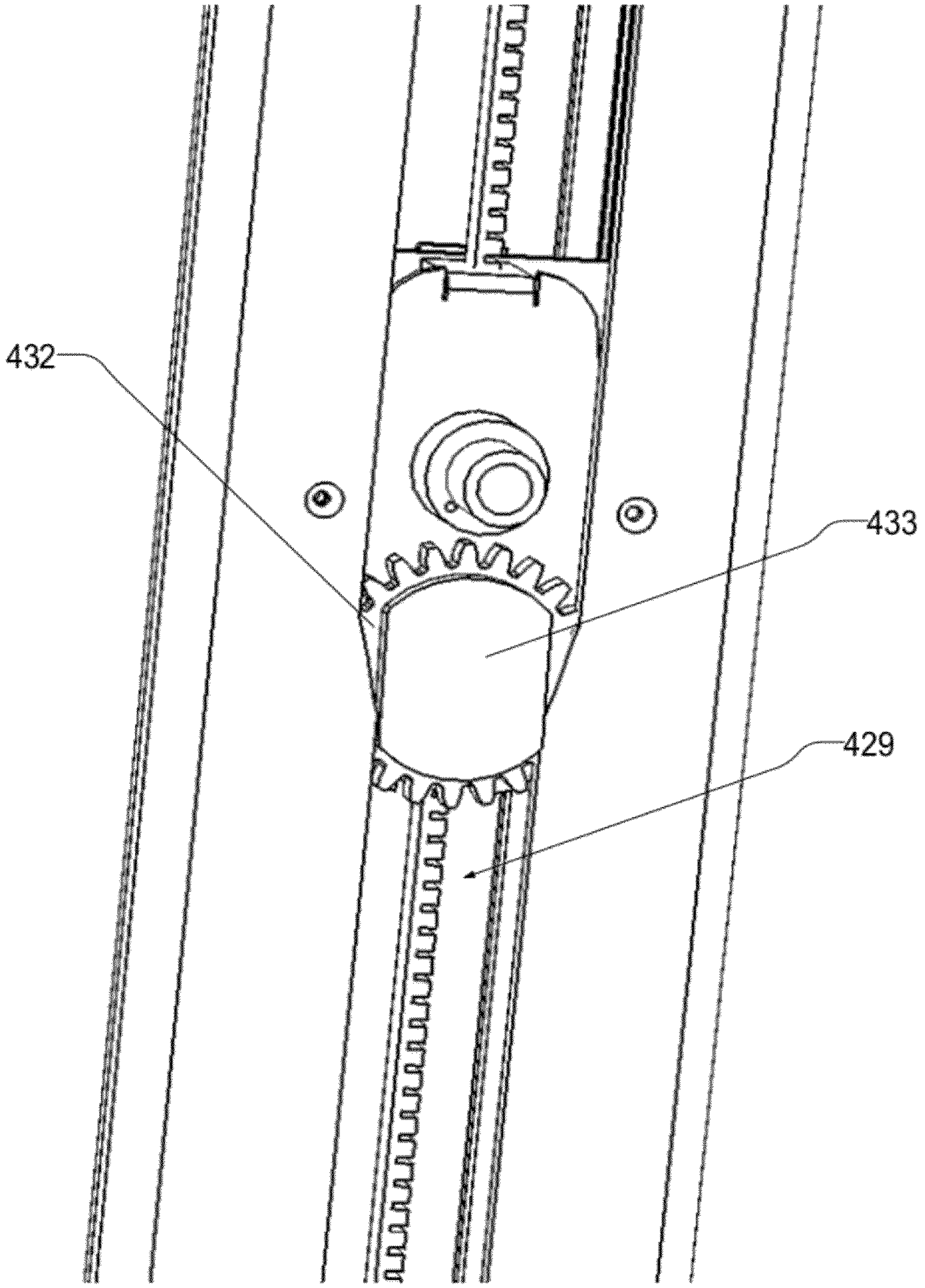

As illustrated in FIG. 19, the frame 420 includes a channel 429 defined in a front face thereof. The channel 429 is generally of uniform width, except in that at a certain point it tapers on each side to a narrower width approximate midpoint thereof, as can be seen in FIG. 19. The pinion 432 includes a protrusion 433 shaped and dimensioned to correspond to the narrower width of the channel 429 of the frame 420. The pinion 432 generally rotates in engagement with the rack 421 as the carriage 430 travels within a top portion of the frame 420. Thus, because the splined gear 434 engages the pinion 432, the splined gear 434 and the water reservoir 414 mounted thereto also generally rotate as the carriage 430 travels within a top portion of the frame 420. However, the rack 421 does not extend all the way to the bottom of the extruded frame 420, and when the carriage 430 descends far enough that the pinion 432 reaches the portion of the extruded frame 420 at which the channel 429 of the extruded frame 420 narrows, the rack 421 ends, and the protrusion 433 of the of the pinion 432 engages the sides of the channel 429, as illustrated via reference to FIGS. 38A-B. Together, this works to cease rotation of the pinion 432, and, in turn, of the splined gear 434 and water reservoir 414. This is why, as described hereinabove, the water reservoir 414 ceases rotation proximate the bottom of the extruded frame and merely descends without rotating. Each of the described components is configured such that the water reservoir undergoes one hundred and eighty degrees of rotation as it descends before ceasing rotation. In a preferred implementation, the rack 421 rotates the pinion 432 four and a half, or three and a half, times, during its descent, which in turn rotates the water reservoir 414 one hundred and eighty degrees. When the carriage 430 ascends, once it is no longer restricted by the channel 429, it re-engages the rack 421 and resumes rotation, thereby effecting rotation of the splined gear 434 and water reservoir 414.

Figure 39:
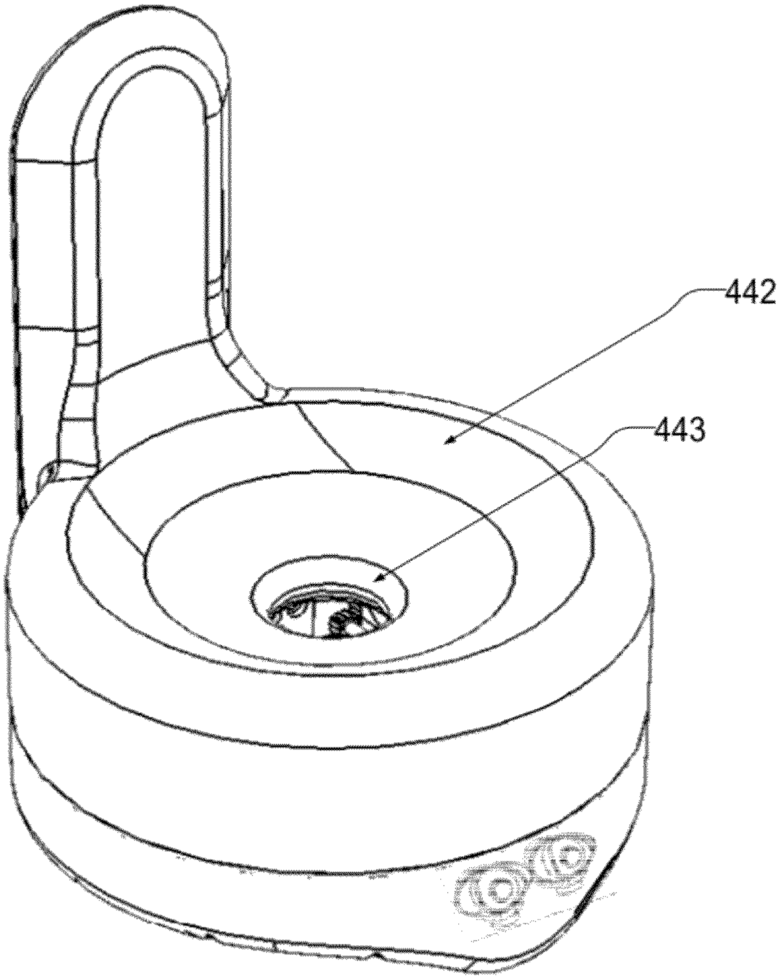
FIG. 39 illustrates the bottle receiving area and associated aperture of the water reservoir of the water dispensing apparatus of FIG. 19.
Figure 40:
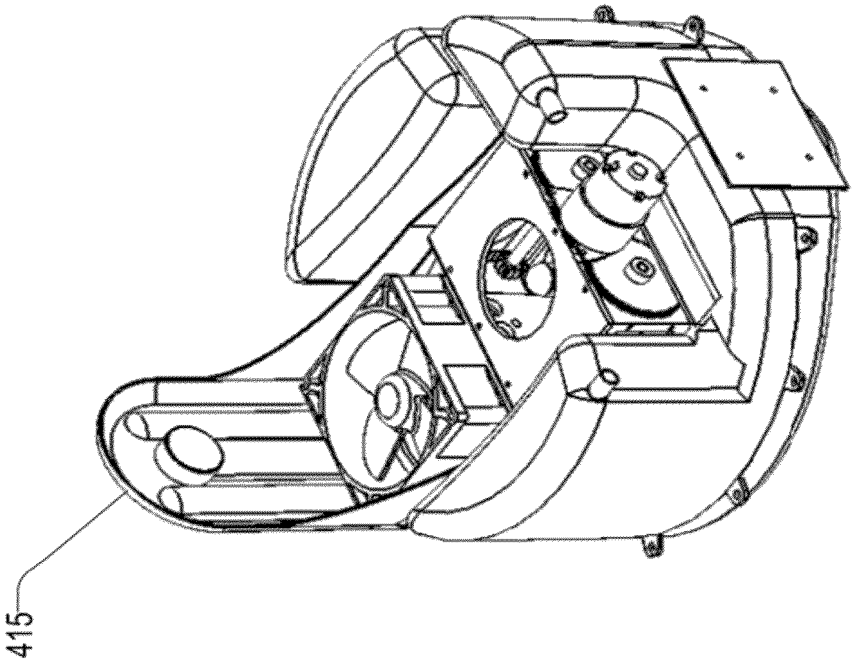
FIG. 40 illustrates the water reservoir of the water dispensing apparatus of FIG. 19, with illustration of an enclosure of the water reservoir being omitted.

As noted hereinabove, the water reservoir 414 includes a bottle receiving area including a receiving aperture configured to receive a neck of a water cooler bottle. FIG. 39 illustrates the receiving aperture 443 of the bottle receiving area 442 of the water reservoir 414. The water reservoir 414 includes an enclosure comprising top and bottom portions. FIG. 40 illustrates the water reservoir 414 without the enclosure.

Figure 41:
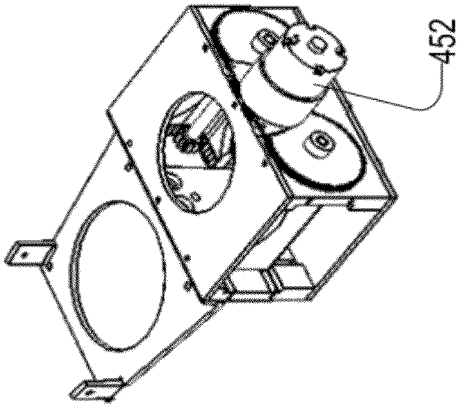
FIGS. 41-43 illustrate components of a clamping assembly of the water reservoir of the water dispensing apparatus of FIG. 19.
Figure 42A:
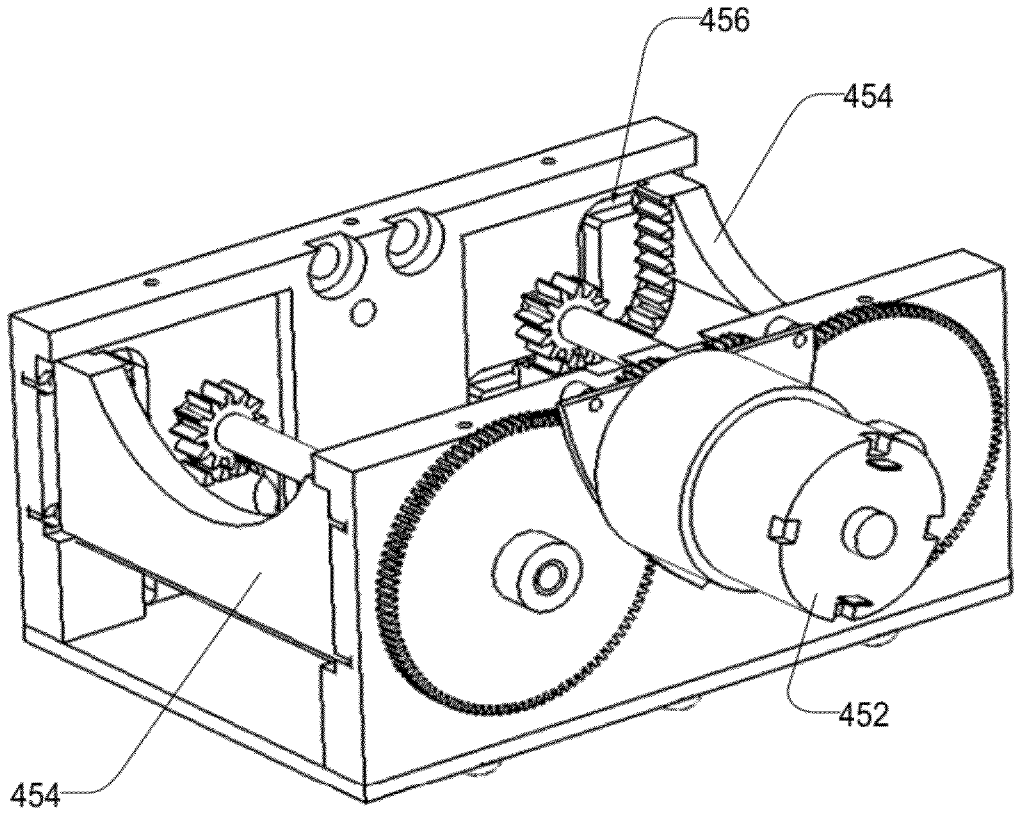
Figure 42B:
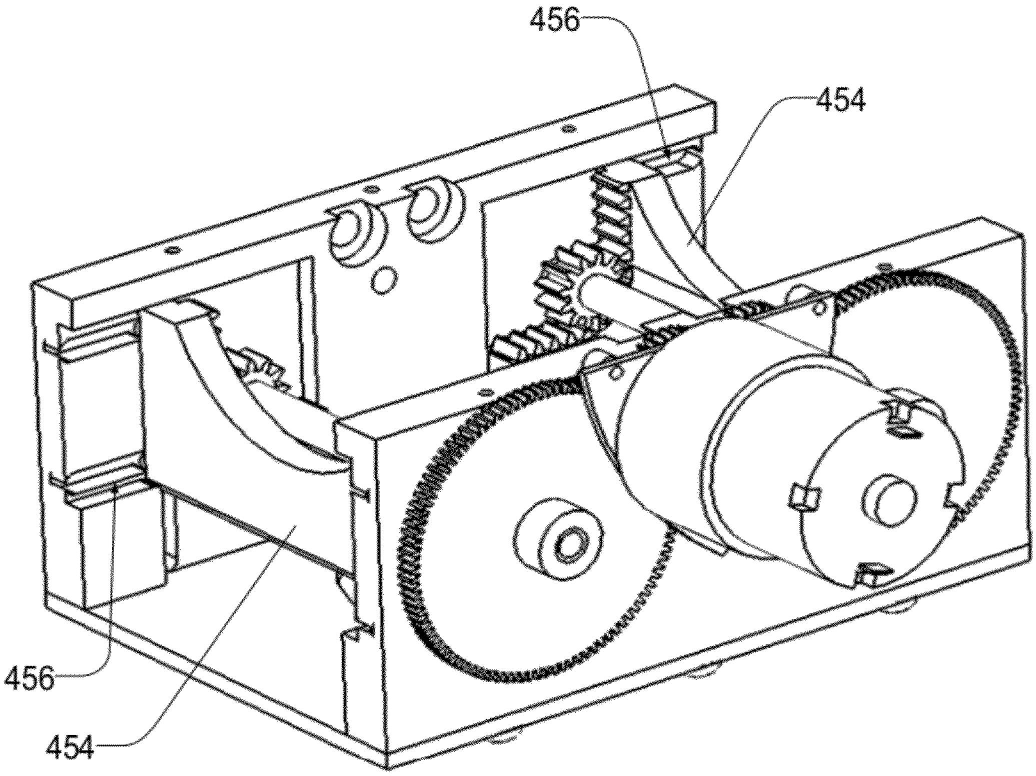
Figure 43:
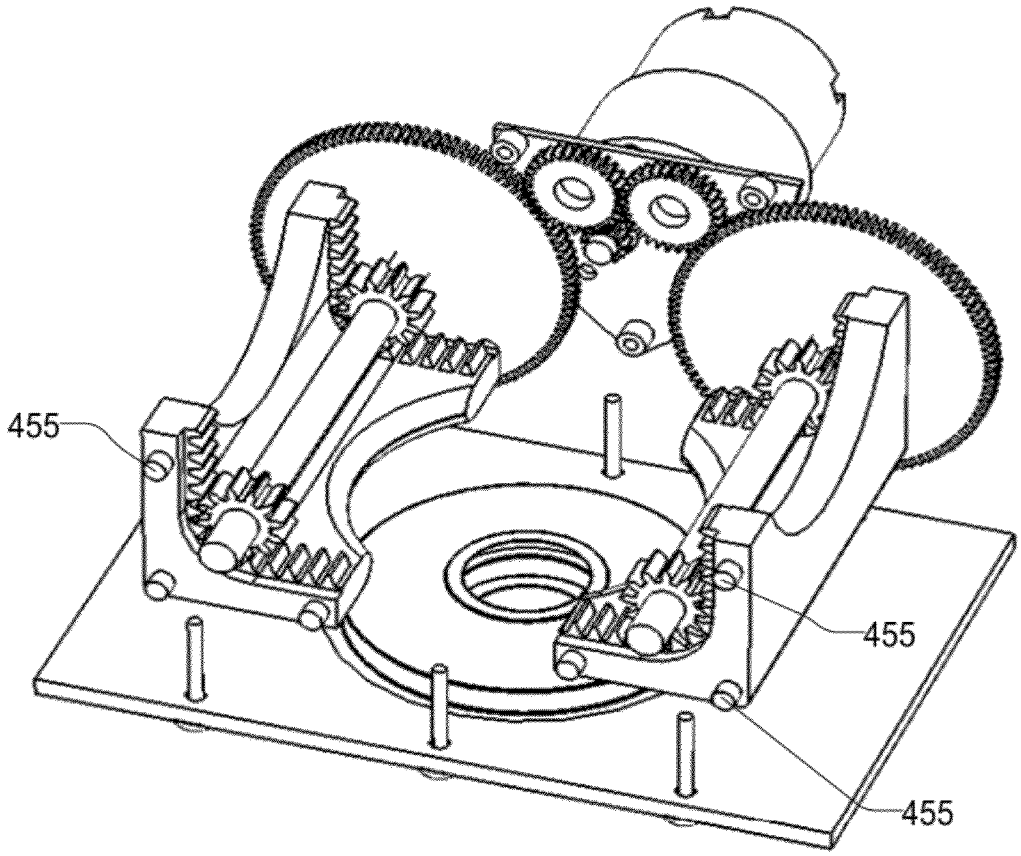
Figure 44:
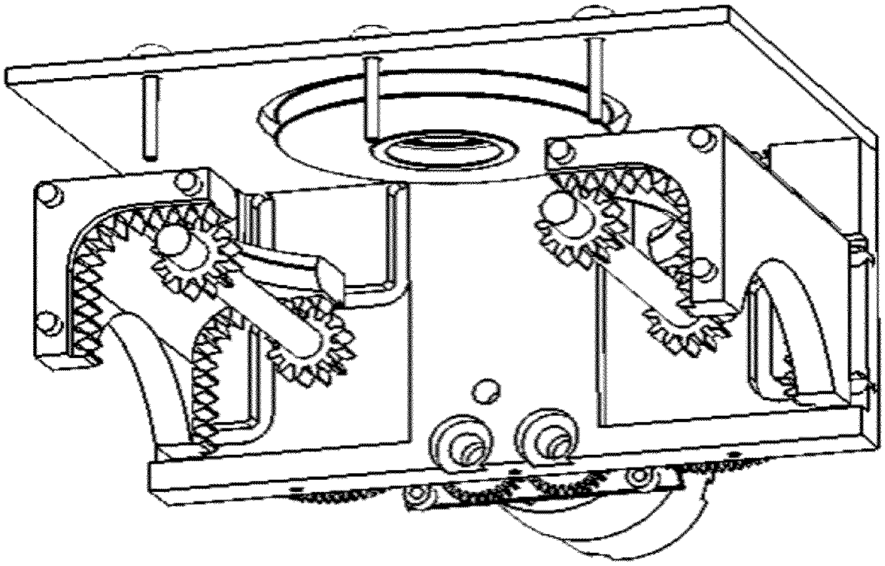
FIGS. 44-47 illustrate the clamping assembly by which a neck of a water bottle is coupled to the water reservoir of the water dispensing apparatus of FIG. 19.
Figure 45:
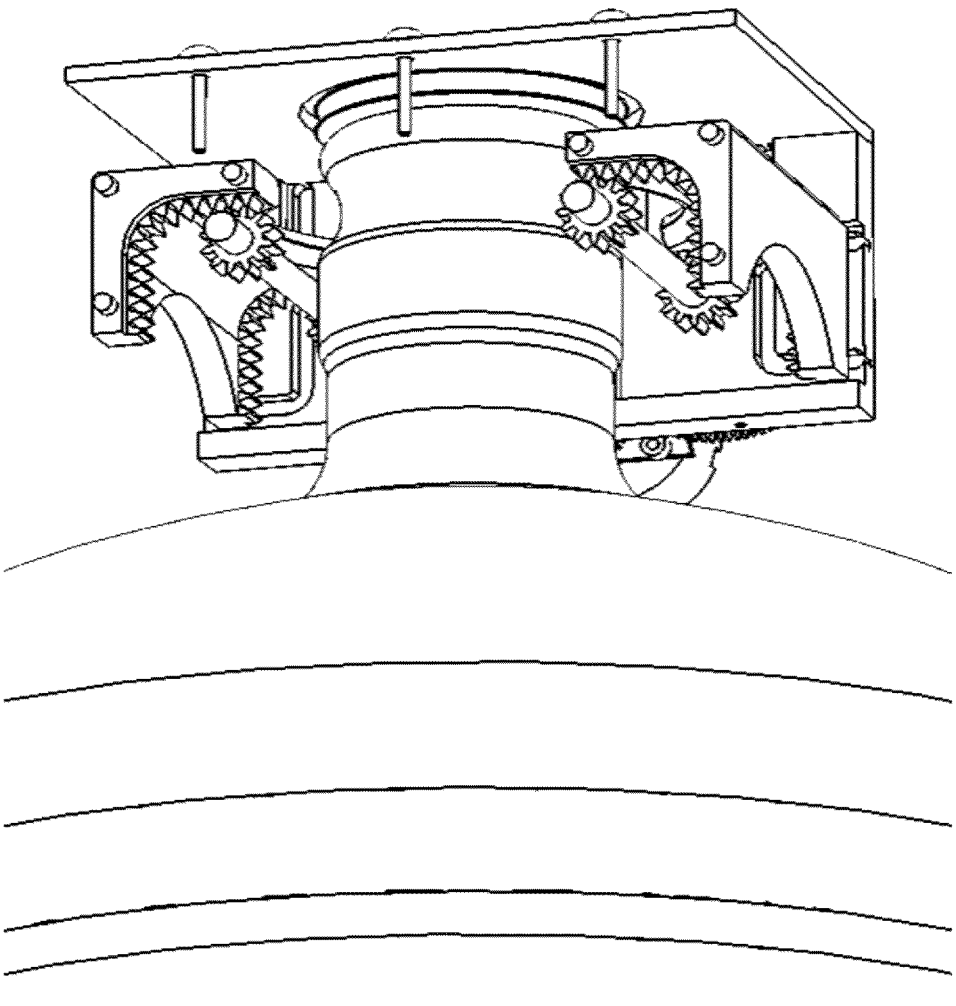
Figure 46:
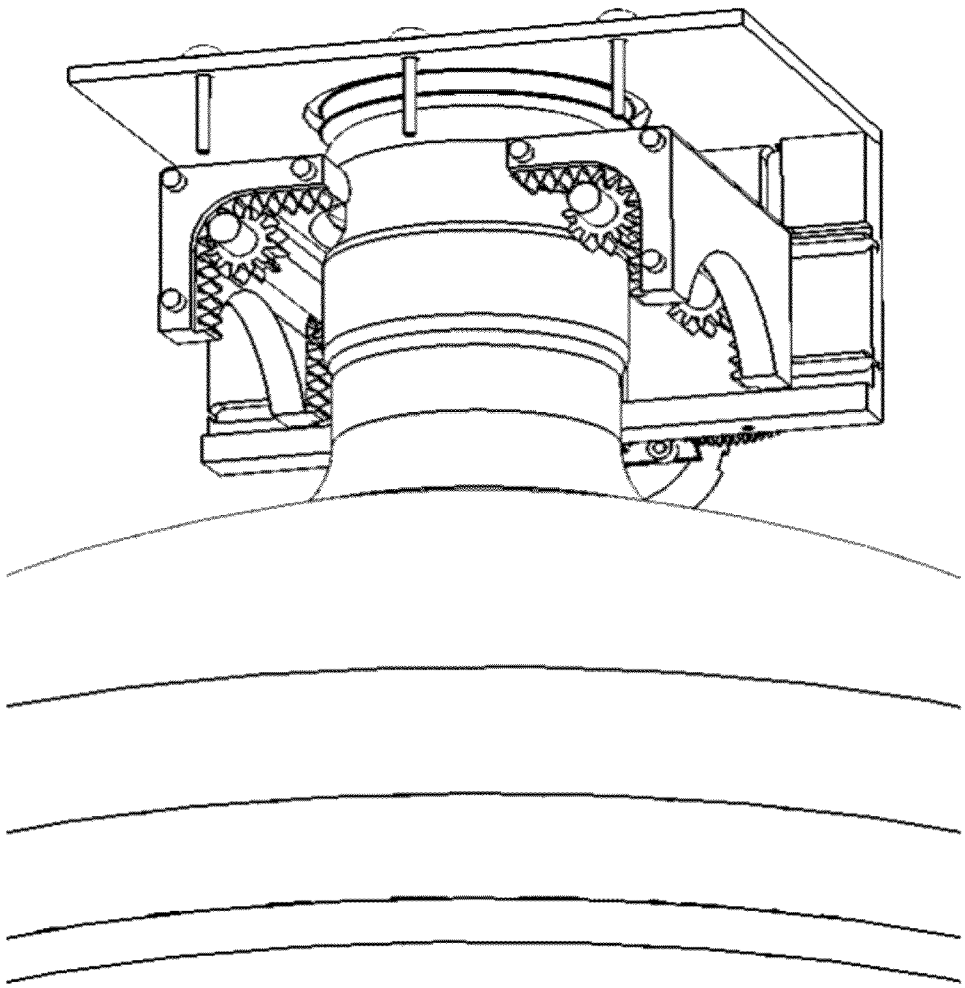
Figure 47:
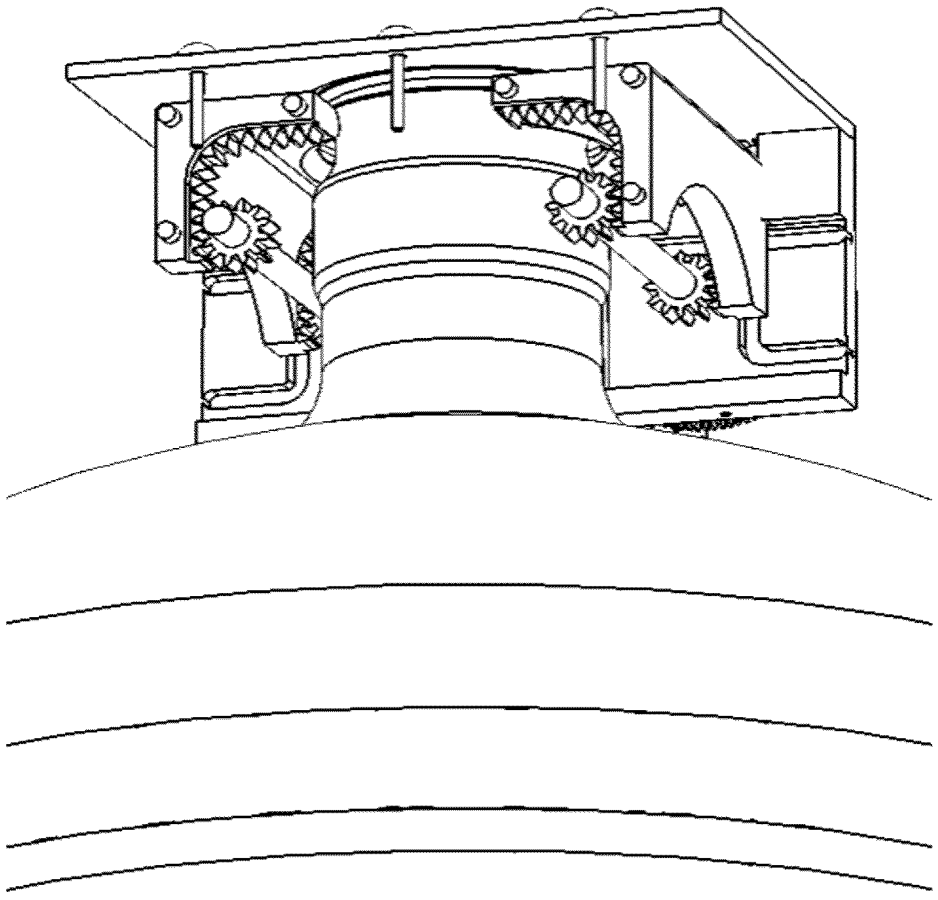

The water reservoir 414 includes a clamping assembly 450, which is illustrated in FIG. 41 (omitting illustration of other components of the water reservoir 414 for clarity). The clamping assembly 450 includes a clamping motor 452 which is configured to drive clamping members 454, as illustrated in FIGS. 42A-B. The clamping motor 452 drives the clamping members 454 via a gear assembly, as illustrated in FIG. 43 (in which side walls are omitted for clarity). As can be seen by reference to FIGS. 42A-B and FIG. 43, the clamping members 454 include pegs 455 which are received in grooves 456 of the side walls.

As perhaps best seen in FIG. 43, each of the clamping members 454 includes a curved portion 456 curved to correspond to a neck of a water cooler bottle. The clamping assembly 450 is configured to clamp around a neck of a water cooler bottle. FIGS. 44-47 illustrate the clamping assembly 450 clamping around a neck of the water cooler bottle 416. Once the water cooler bottle 416 is disposed within the clamping assembly 450, the clamping motor 452 drives the clamping members 454 together. Even as the pegs 455 of the clamping members 454 reach the innermost portion of the grooves 456 of the side walls, the clamping motor 452 continues to drive the clamping members 454, causing the clamping members to be driven upwards in accordance with the grooves 456, as illustrated in FIG. 30. This causes the water cooler bottle 416 to be clamped securely.

Figure 48:
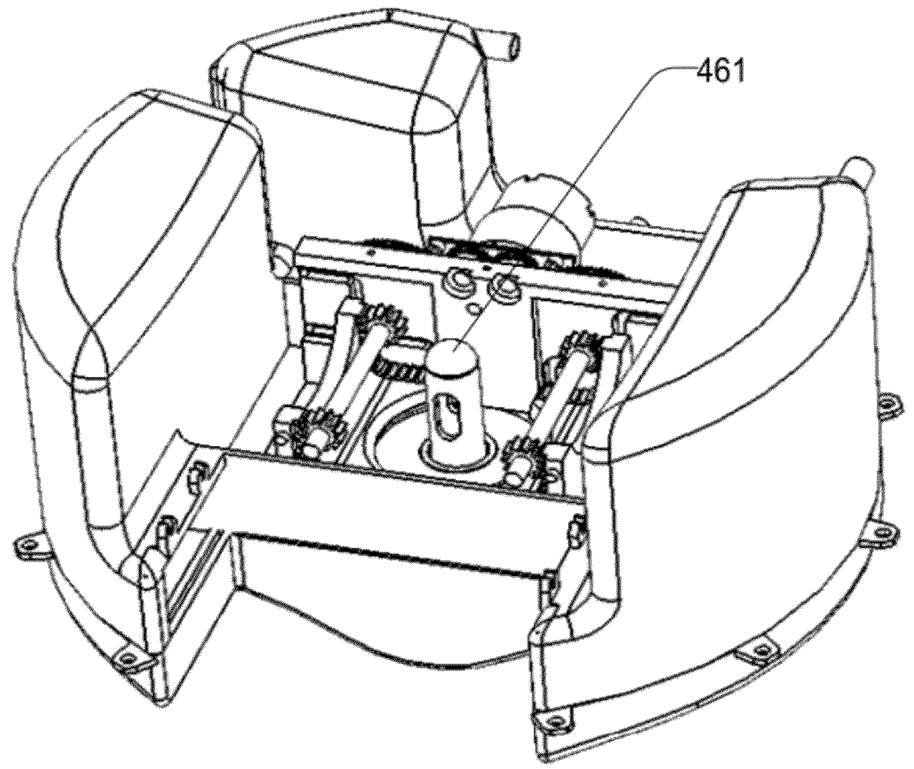
FIG. 48 illustrates a generally hollow protruding member which is configured to allow water to pass into the compartments of the water reservoir of the water dispensing apparatus of FIG. 19.
Figure 49:
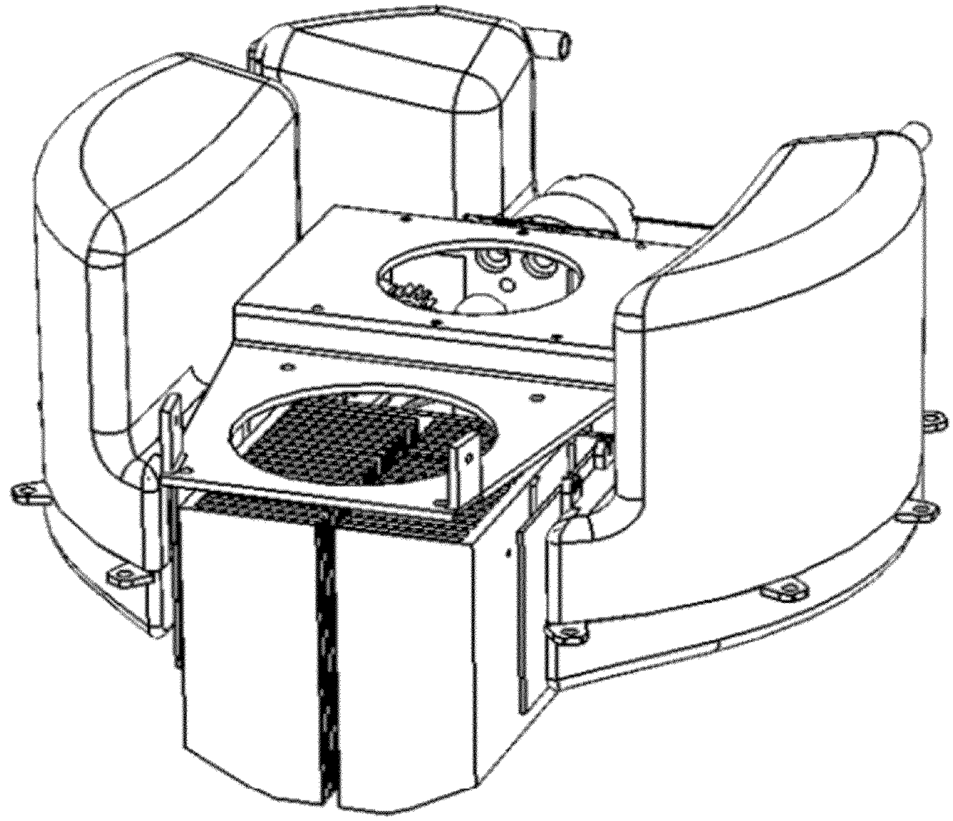
FIG. 49 illustrates a Peltier element for a cooling compartment of the water reservoir of the water dispensing apparatus of FIG. 19.
Figure 50:
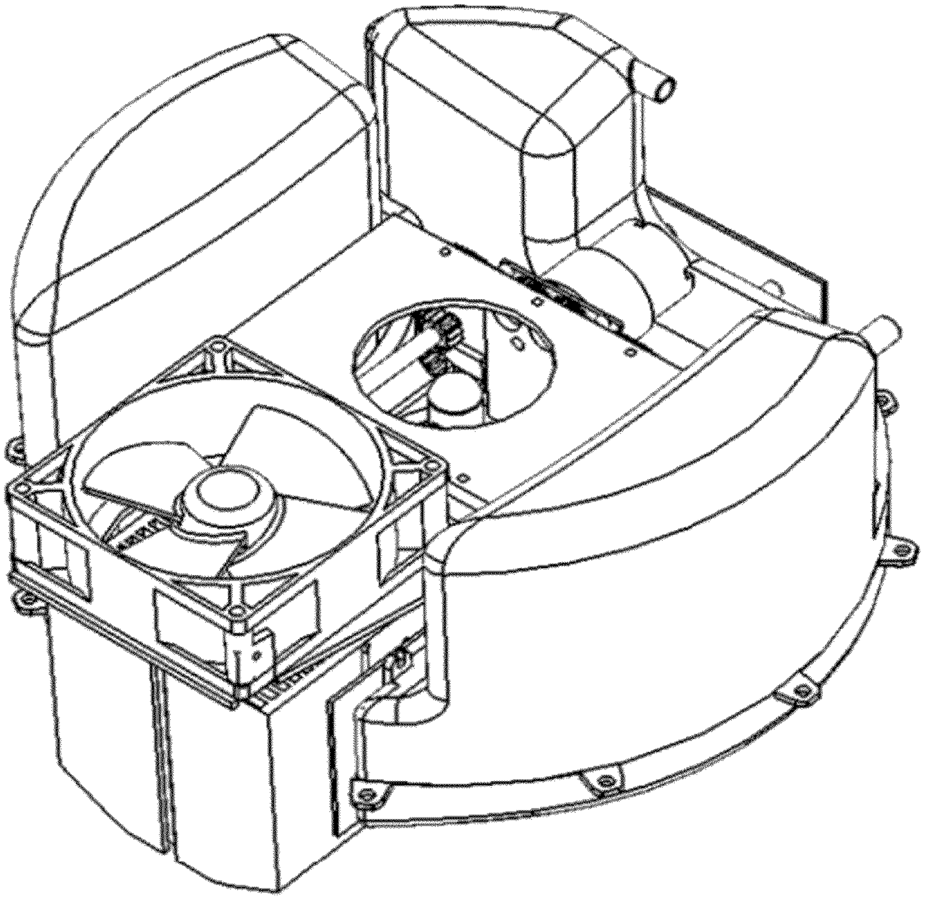
FIG. 50 illustrates a fan for cooling the Peltier element of FIG. 49.

The water reservoir 414 further comprises one or more compartments. As illustrated in FIG. 48, the water reservoir 414 includes a generally hollow protruding member 461 configured to let water from a secured water bottle pass into the one or more compartments. In at least some preferred implementations, such compartments include a cooling compartment and a heating compartment as described hereinabove. FIG. 49 illustrates a Peltier element 462 for such a cooling compartment, and FIG. 50 illustrates a fan 464 for cooling the Peltier element 462.

Figure 51:
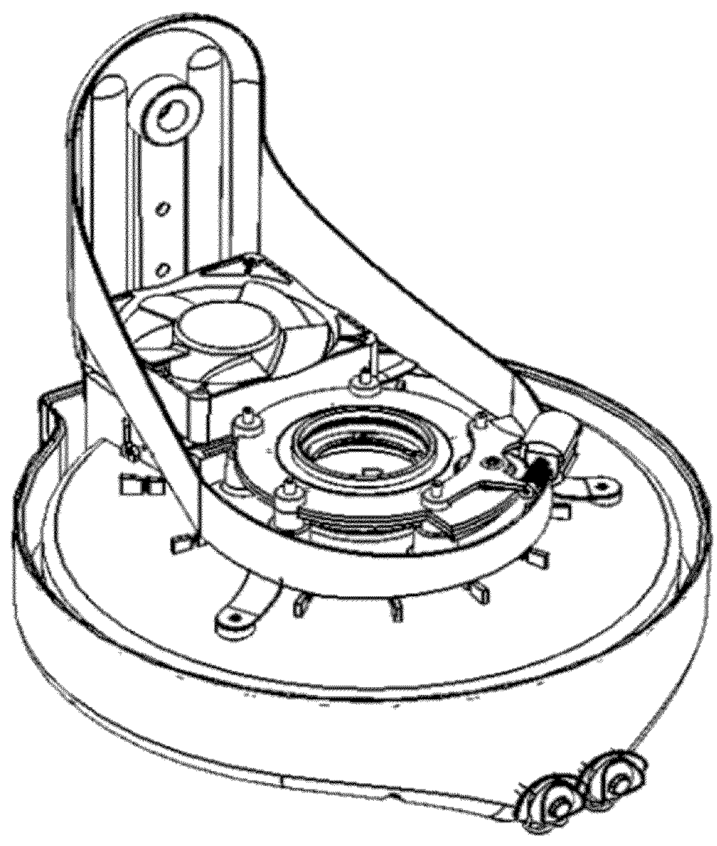
FIG. 51 illustrates an alternative water reservoir in accordance with one or more preferred implementations.
Figure 52:
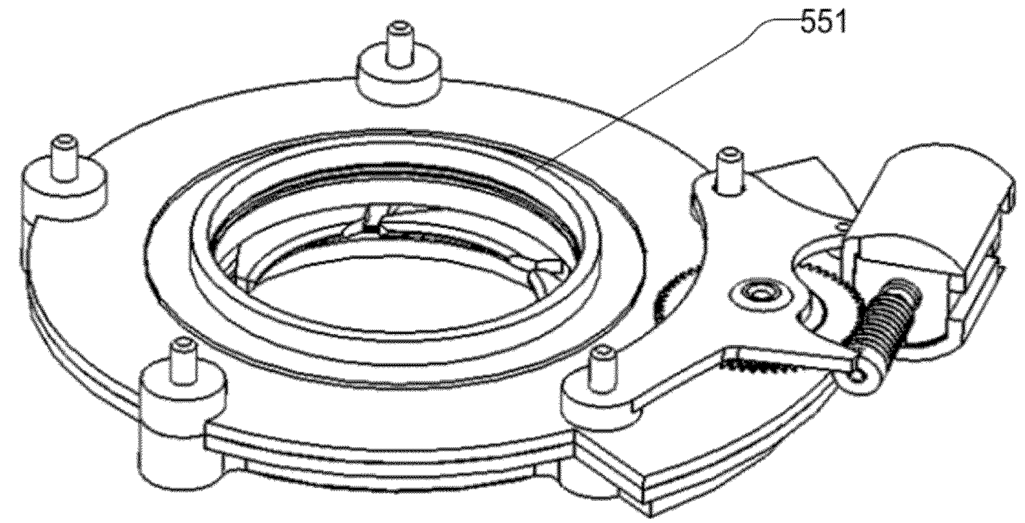
FIGS. 52-58 illustrate components of an alternative clamping assembly.
Figure 53:
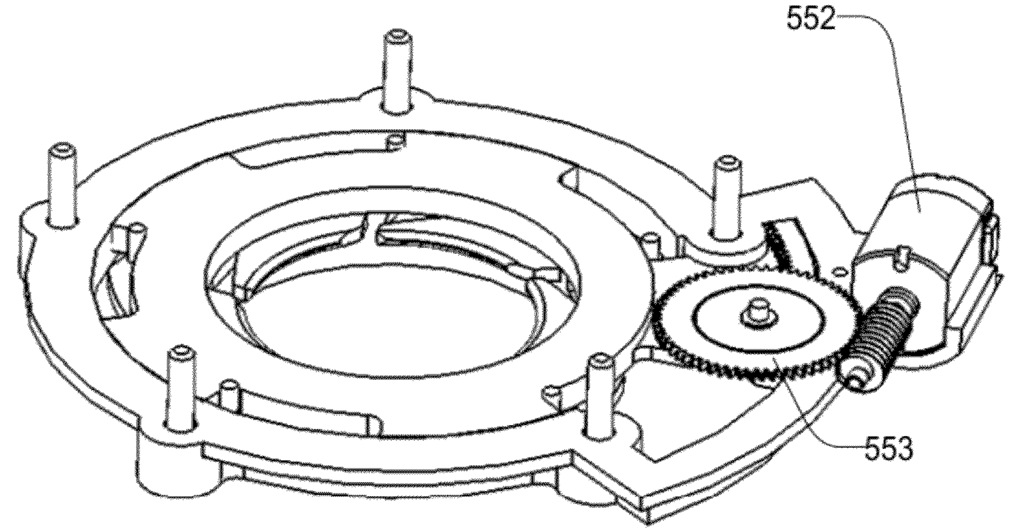
Figure 54A:
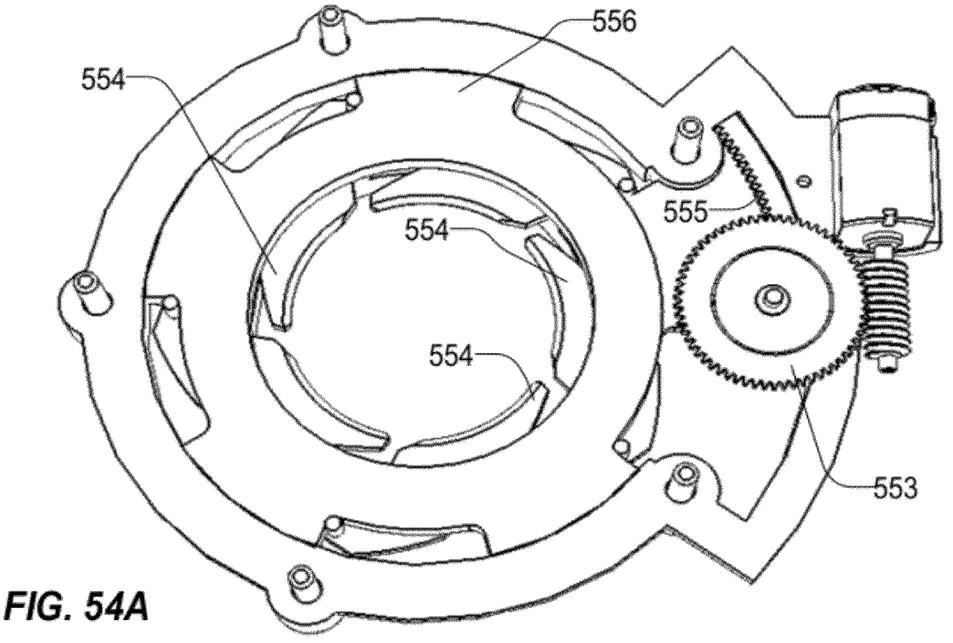
Figure 54B:
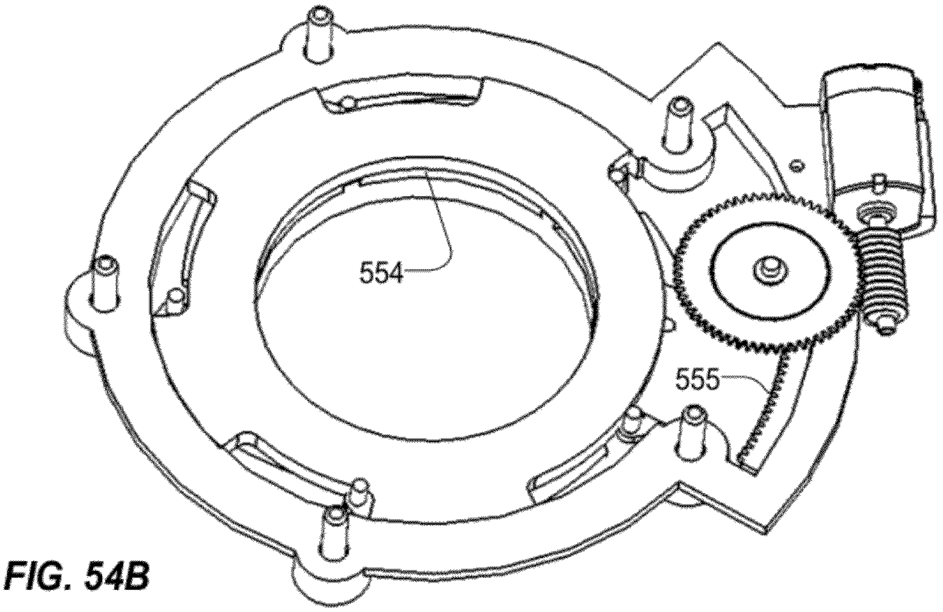
Figure 55A:
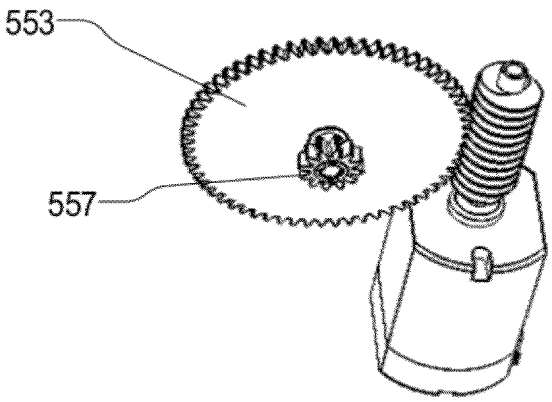
Figure 55B:
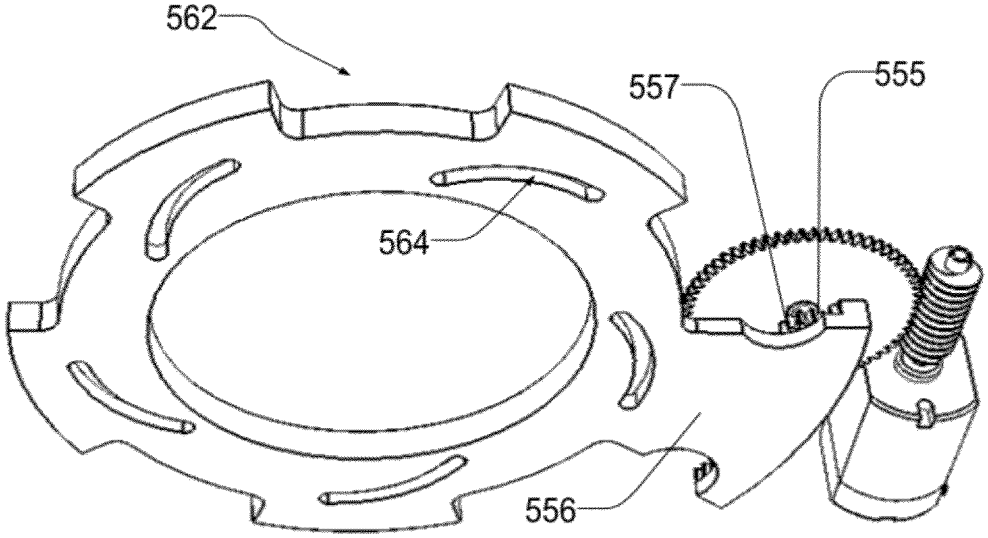

FIG. 51 illustrates an alternative water reservoir 514 in accordance with one or more preferred implementations. As with the water reservoir 414, the water reservoir 514 includes an enclosure (however, one of the enclosure halves has been omitted from illustration in FIG. 51 in order to illustrate internal components of the water reservoir 514). The water reservoir 514 includes a clamping assembly 550, which is illustrated in FIG. 52 (omitting illustration of other components of the water reservoir 514 for clarity). The clamping assembly 550 includes one or more gaskets 551, as illustrated in FIG. 52. The clamping assembly further includes one or more clamping members 554 which are configured to clamp inward upon a neck of a bottle, and retract back, as illustrated in FIGS. 54A-B. The movement of the clamping members 554 is driven by a motor 552. Specifically, the motor 552 drives a cluster gear 553 which is coupled to a floating pinion 557 such that the two rotate together, as illustrated in FIG. 55A. The floating pinion 557 engages a rack portion 555 of a slot plate 556 of the clamping assembly 550, as illustrated in FIG. 55B. In operation, the motor 552 effects rotation of the cluster gear 553 and floating pinion 557 which in turn, via the rack portion 555 of the slot plate 556, effects rotation of the slot plate 556. The slot plate 556 includes a plurality of exterior slots 562 and interior slots 564. The exterior and interior slots 562,564 are configured to effect movement of the clamping members 554 as the slot plate 556 rotates. The clamping members 554 include a plurality of pegs which are received in both the interior slots 564 of the slot plate 556 and slots of a base plate disposed on the opposite side of the clamping members 554. The pegs of the clamping members slide in the interior slots 564 of the slot plate 556 as the slot plate 556 rotates.

Figure 56A:
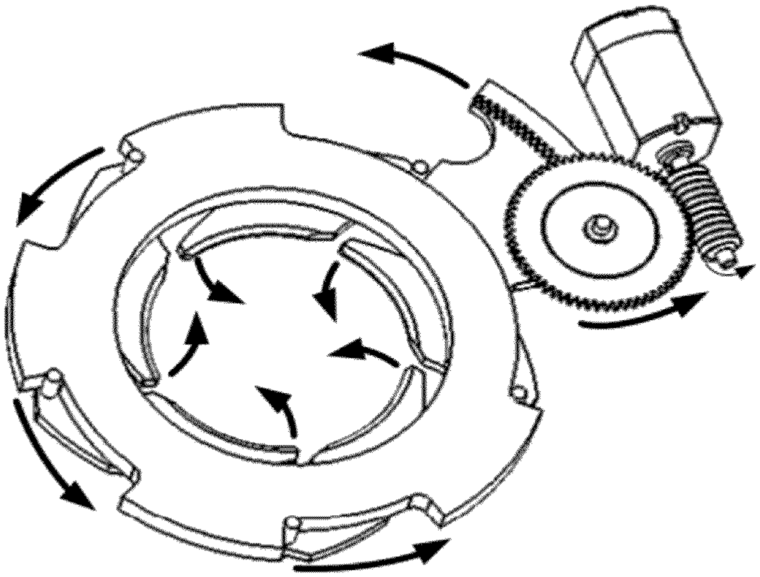
Figure 56B:
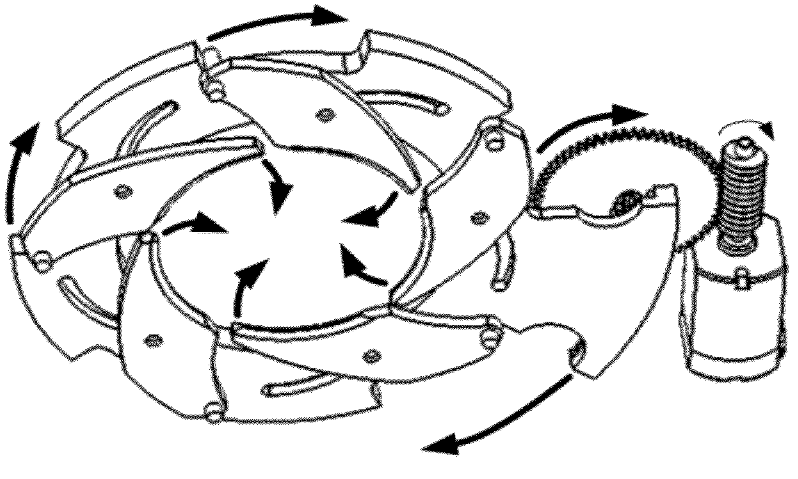

FIG. 56A illustrates from a first perspective the direction of movement of the cluster gear 553, the slot plate 556, and the clamping members 554 as the clamping assembly 550 concludes transitioning from an unclamped configuration to a clamped configuration. FIG. 56B illustrates the same from a second, generally opposite perspective.

Figure 57:
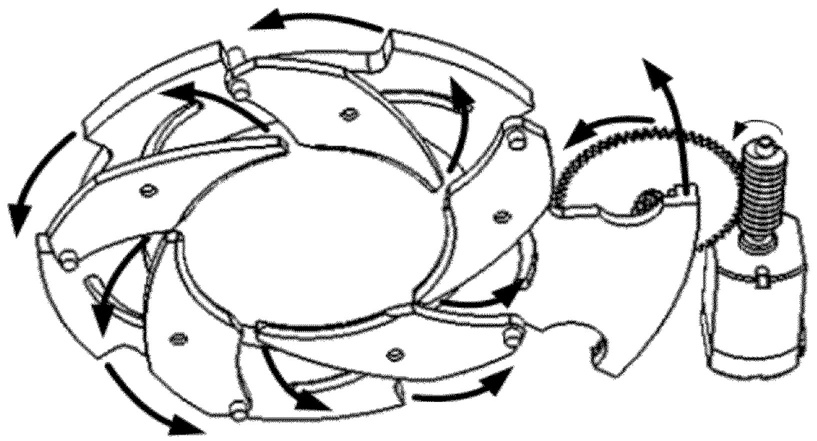
Figure 58:
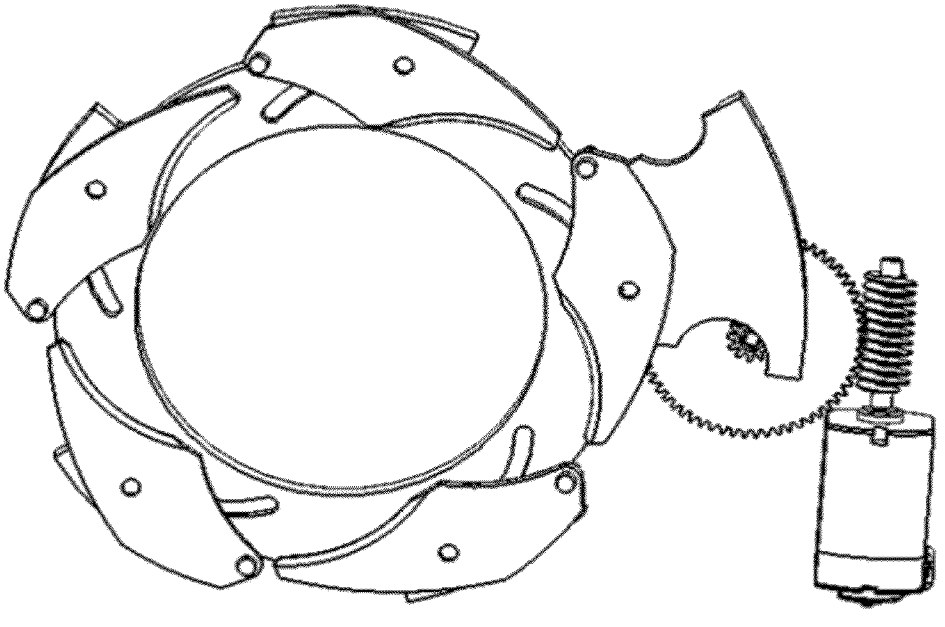
Figure 59A:
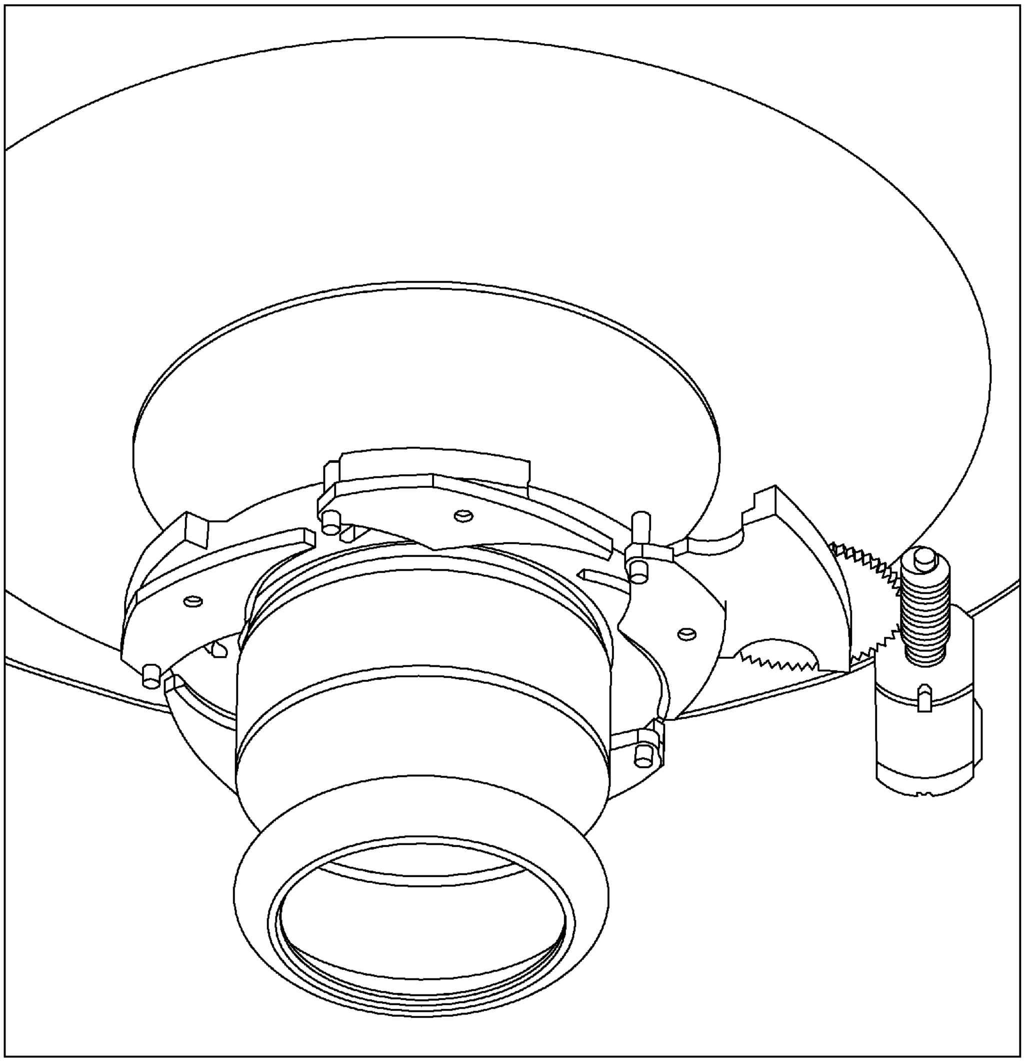
FIGS. 59A-B illustrate components of the clamping assembly of FIGS. 52-58 clamping around a neck of a water cooler bottle.
Figure 59B:
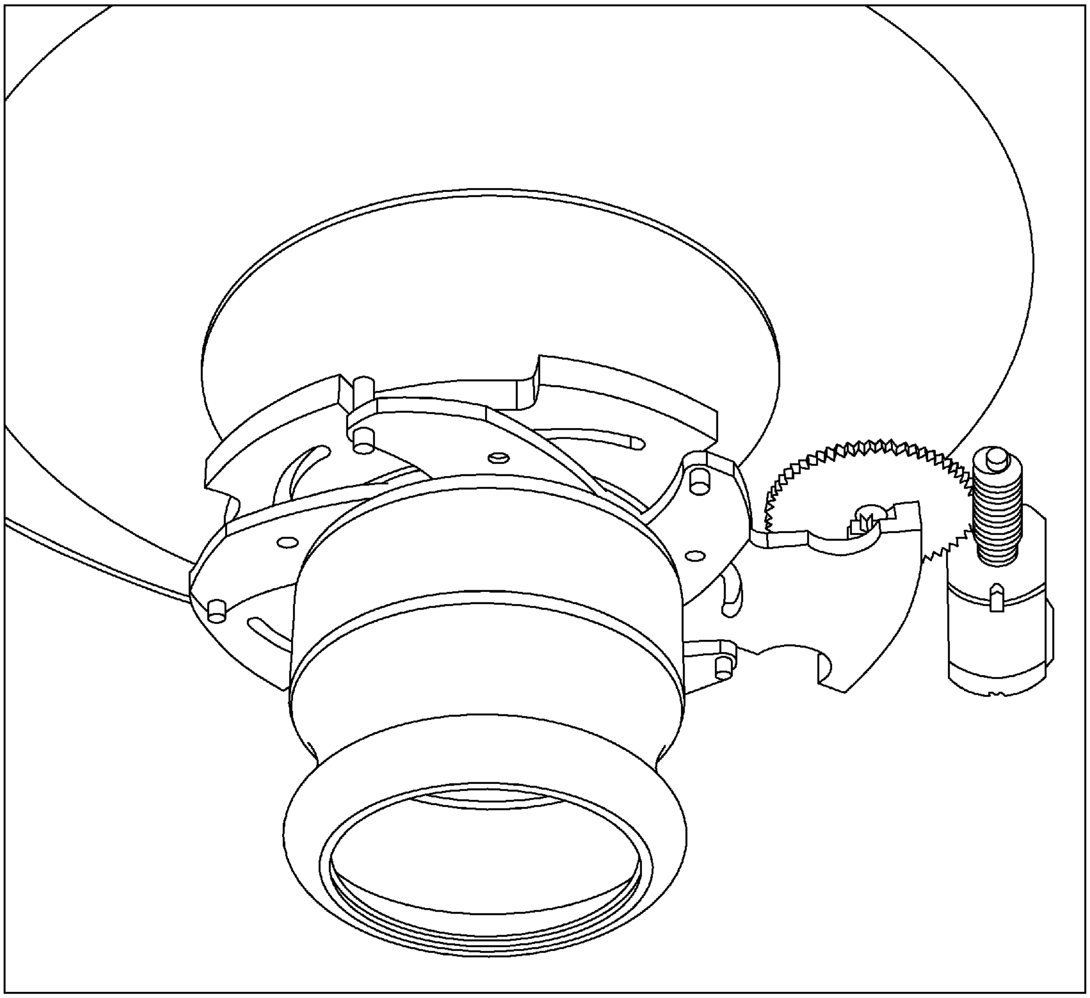

FIG. 57 illustrates, from the second perspective, the direction of movement of the same components as the clamping assembly 550 begins transitioning from the clamped to an unclamped configuration, and FIG. 58 illustrates the same components from the same perspective after the clamping assembly 550 has concluded transitioning to the unclamped configuration. FIGS. 59A-B illustrate transitioning of the clamping members 554 from an unclamped configuration to a clamped configuration in order to clamp the neck of a water cooler bottle.

In one or more alternative implementations, a carriage of a water dispensing apparatus is raised or lowered via an alternative mechanism. For example, in a preferred implementation, a carriage of a water dispensing apparatus is secured to a cable and a motor raises and lowers the carriage via winding and unwinding of the cable.

Figure 60A:
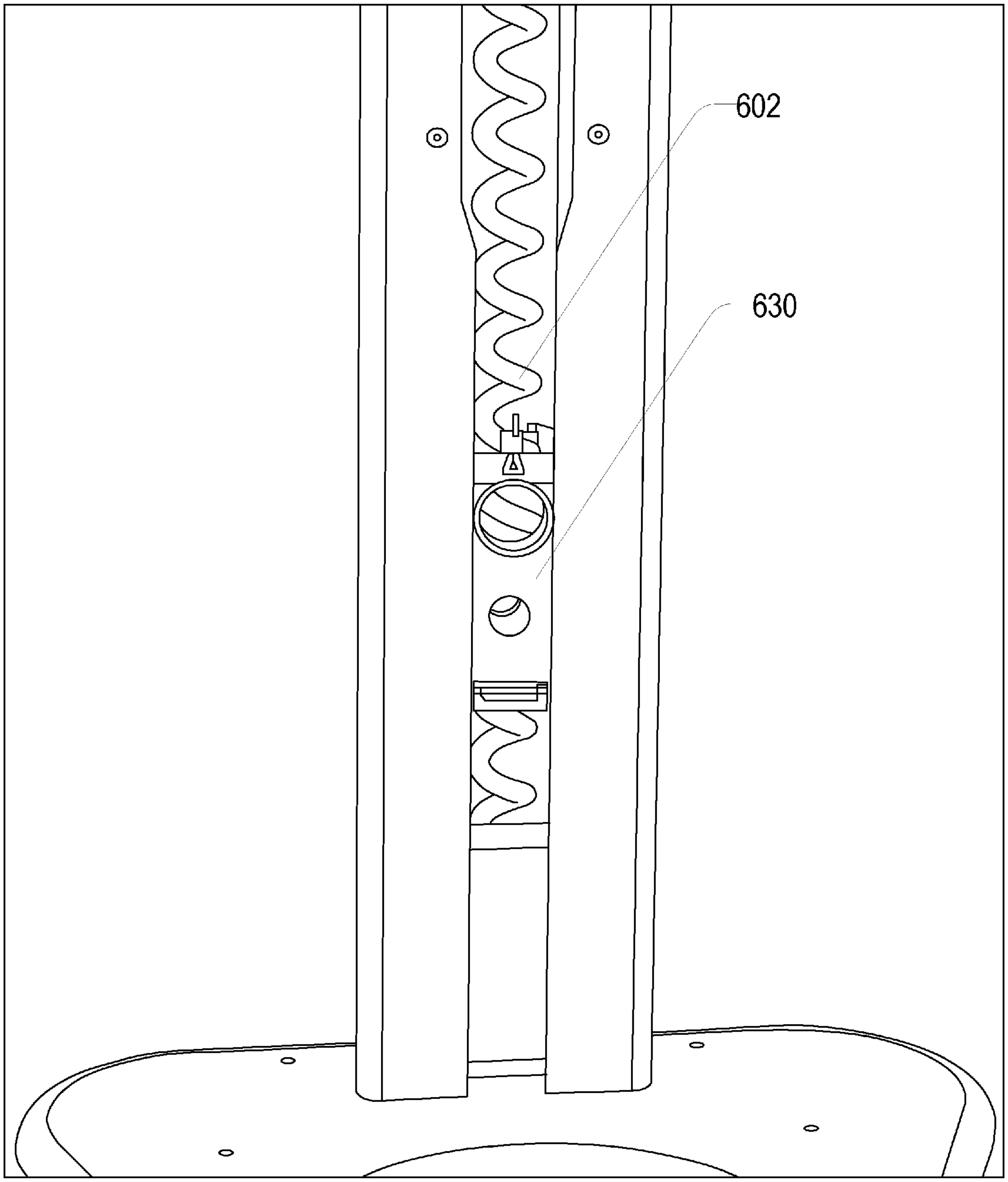
FIGS. 60A-B illustrate a mechanism of an alternative lifting system for elevating a carriage, which includes an inclined surface.
Figure 60B:
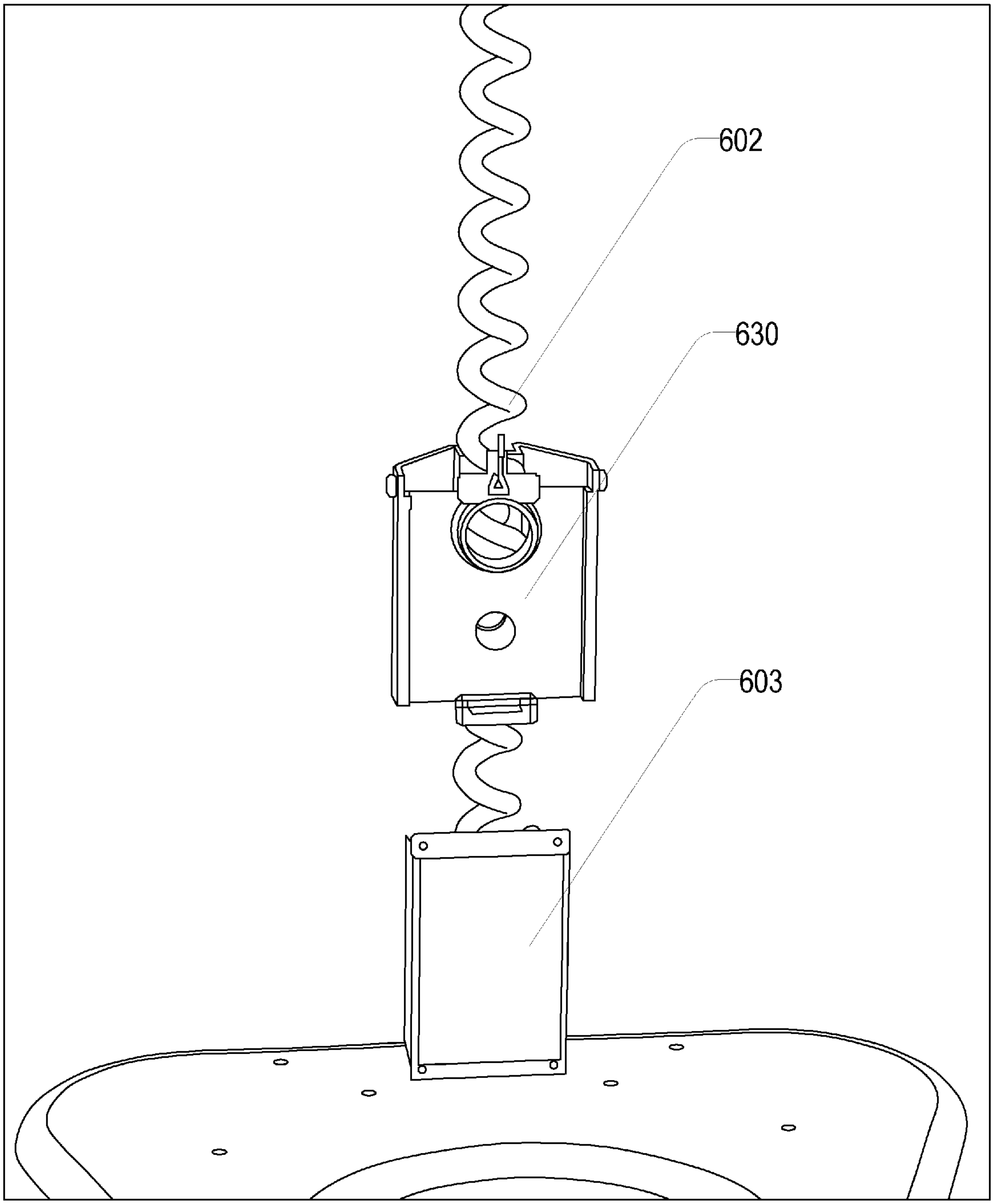

In another preferred implementation, a mechanism for elevating a carriage includes an inclined surface 602 (which resembles a coil) extending along a vertical extent, as illustrated in FIGS. 60A-B. As illustrated, a carriage 630 rides along the coiled, inclined surface 602. In use, a motor 603 effects rotation of the inclined surface 602, thereby effecting raising or lowering of the carriage 630.

In one or more preferred implementations, a water reservoir includes a pump (not illustrated). For example, in a preferred implementation, a water reservoir includes a pump that allows the water reservoir to dispense water from a compartment via a dispenser that is disposed vertically higher than a water level in the compartment.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A water dispensing apparatus, comprising:

(a) a water reservoir, comprising, (i) a compartment for receiving and storing water from a water bottle, (ii) a water bottle receiving area by which a mouth of a water bottle is received for the flow of water from the water bottle into the compartment of the water reservoir, (iii) a mechanism by which a water bottle is securely coupled to the water reservoir, and (iv) a dispenser by which a user selectively dispenses water from the compartment of the water reservoir; and (b) a lifting system, comprising,
(i) a carriage,
(ii) a track along which the carriage traverses,
(iii) a motor assembly by which traversal of the carriage along the track is driven, and
(iv) a coupling mechanism connecting the water reservoir to the carriage and enabling rotation of the water reservoir relative to the carriage,
(c) wherein the water reservoir is transitionable between,
(i) a lower position of the water reservoir, in which a water bottle in an upright orientation is coupled to the water reservoir, with a mouth of the water bottle being received in the water bottle receiving area of the water reservoir, and
(ii) an upper position of the water reservoir, in which the water reservoir is rotated and a water bottle coupled thereto is transitioned into an inverted orientation, with the mouth of the water bottle facing downwardly for gravitationally induced flow of water from the water bottle into the water reservoir.

2. The water dispensing apparatus of claim 1, further comprising a water bottle coupled with the water reservoir by the mechanism.

3. The water dispensing apparatus of claim 1, wherein the water reservoir is configured to engage the water bottle such that a watertight seal is formed between the water reservoir and the water bottle, whereby water received within the water reservoir from the water bottle does not leak during rotation of the water reservoir and inversion of the water bottle.

4. The water dispensing apparatus of claim 1, wherein the lifting system comprises a single vertical support.

5. The water dispensing apparatus of claim 1, wherein the lifting system comprises two vertical supports, each vertical support extending on an opposite side of the water reservoir.

6. The water dispensing apparatus of claim 1, wherein rotation of the water reservoir is simultaneous with, and dependent upon, movement of the carriage along at least a portion of the track.

7. The water dispensing apparatus of claim 1, wherein the water reservoir comprises a first compartment in which water is stored and cooled, and a second compartment in which water is stored and heated.

8. A method for installing a water bottle in a water dispensing apparatus, comprising the steps of:
(a) coupling a water reservoir to a water bottle oriented in an upright position;
(b) raising and rotating the water reservoir with the water bottle coupled therewith such that the water bottle is inverted; and
(c) filling a compartment of the water reservoir with water from the inverted water bottle as a result of the inversion of the water bottle for dispensing of water from the compartment through a dispenser of the water reservoir.

9. The method of claim 8, further comprising dispensing water from the compartment of the water reservoir through a dispenser of the water reservoir.

10. The method of claim 8, further comprising the steps of,
(d) lowering and rotating the water reservoir with the water bottle coupled therewith such that the water bottle is returned to the upright position, wherein the water bottle is generally emptied of water;
(e) decoupling the water reservoir from the water bottle oriented in the upright position;
(f) replacing the water bottle with a generally full water bottle;
(g) raising and rotating the water reservoir with the water bottle coupled therewith such that the water bottle is inverted; and
(h) filling the compartment of the water reservoir with water from the inverted water bottle as a result of the inversion of the water bottle for further dispensing of water from the compartment through the dispenser of the water reservoir.

11. A water dispensing apparatus, comprising:
(a) a lift comprising a base and a single vertical support extending upwardly from the base; and
(b) a water reservoir from which water is dispensed and which is configured to receive a water bottle;
(c) wherein the lift is adapted to raise and lower the water reservoir along the vertical support;
(d) wherein the lift is adapted to rotate the water reservoir during lifting along the vertical support; and
(e) wherein the water reservoir is supported during lifting and rotation by the single vertical support.

* * * * *